(12) United States Patent
Brehm et al.

(10) Patent No.: US 10,195,889 B2
(45) Date of Patent: Feb. 5, 2019

(54) OPTICALLY VARIABLE ELEMENT

(71) Applicants: LEONHARD KURZ Stiftung & Co. KG, Furth (DE); OVD Kinegram AG, Zug (CH)

(72) Inventors: Ludwig Brehm, Adelsdorf (DE); Sebastian Mader, Lucerne (CH); Andreas Schilling, Hagendorn (CH); Wayne Robert Tompkin, Baden (CH); Harald Walter, Horgen (CH)

(73) Assignees: Leonhard Kurz Stiftung & Co. KG, Furth (DE); OVD Kinegram AG, Zug (DE)

( * ) Notice: Subject to any disclaimer, the term of this patent is extended or adjusted under 35 U.S.C. 154(b) by 271 days.

(21) Appl. No.: 14/892,420

(22) PCT Filed: May 6, 2014

(86) PCT No.: PCT/EP2014/059238
§ 371 (c)(1),
(2) Date: Nov. 19, 2015

(87) PCT Pub. No.: WO2014/187665
PCT Pub. Date: Nov. 27, 2014

(65) Prior Publication Data
US 2016/0167422 A1 Jun. 16, 2016

(30) Foreign Application Priority Data
May 22, 2013 (DE) .................. 10 2013 105 246

(51) Int. Cl.
*G02B 5/18* (2006.01)
*B42D 25/00* (2014.01)
(Continued)

(52) U.S. Cl.
CPC ........... *B42D 25/328* (2014.10); *B42D 25/00* (2014.10); *B42D 25/29* (2014.10); *B42D 25/324* (2014.10);
(Continued)

(58) Field of Classification Search
CPC ................................................... B42D 25/328
(Continued)

(56) References Cited

U.S. PATENT DOCUMENTS 4,484,797 A 11/1984 Knop et al.
4,568,141 A 2/1986 Antes
(Continued)

FOREIGN PATENT DOCUMENTS

CN 1646331 7/2005
CN 1894951 1/2007
(Continued)

OTHER PUBLICATIONS

H. Lochbihler, "Colored Images Generated by Metallic Sub-Wavelength Gratings," Optics Express, vol. 17, Nr. 14, S. 12189-12195, published in Jul. 2009.

*Primary Examiner* — Kimberly N. Kakalec
(74) *Attorney, Agent, or Firm* — Hoffmann & Baron, LLP

(57) ABSTRACT

An optically variable element has first and second diffraction gratings which are high-frequency and therefore act reflectively into the zero diffraction order. Either a first color is generated by the first diffraction grating at a particular angle of rotation and a particular angle of illumination and simultaneously a second color, different from the first color, is generated by the second diffraction grating or a visible color is generated essentially only by the first diffraction grating at a first angle of rotation and a visible color is generated essentially only by the second diffraction grating at a second angle of rotation.

34 Claims, 22 Drawing Sheets

(51) Int. Cl.
  *B42D 25/29* (2014.01)
  *G02B 27/42* (2006.01)
  *B42D 25/324* (2014.01)
  *B42D 25/328* (2014.01)

(52) U.S. Cl.
  CPC ......... *G02B 5/1809* (2013.01); *G02B 5/1861* (2013.01); *G02B 27/4244* (2013.01); *G02B 27/4272* (2013.01); *B42D 2035/50* (2013.01)

(58) Field of Classification Search
  USPC .................................................. 359/2; 283/86
  See application file for complete search history.

(56) References Cited

U.S. PATENT DOCUMENTS

| | | | |
|---|---|---|---|
| 5,784,200 | A | 7/1998 | Modegi |
| 5,969,863 | A | 10/1999 | Staub et al. |
| 7,102,823 | B2 | 9/2006 | Schilling et al. |
| 2003/0104206 | A1 | 6/2003 | Argoitia et al. |
| 2005/0082819 | A1 | 4/2005 | Tompkin et al. |
| 2006/0181077 | A1* | 8/2006 | Kaule .................. B41M 3/148 283/72 |
| 2007/0165309 | A1 | 7/2007 | Laakkonen et al. |
| 2008/0272883 | A1* | 11/2008 | Toda .................. G02B 5/1809 340/5.8 |
| 2010/0315714 | A1* | 12/2010 | Tompkin ................ B42D 25/20 359/571 |
| 2013/0258477 | A1 | 10/2013 | Lok et al. |
| 2014/0085725 | A1 | 3/2014 | Lochbihler et al. |
| 2014/0285892 | A1 | 9/2014 | Sauvage-Vincent et al. |

FOREIGN PATENT DOCUMENTS

| | | |
|---|---|---|
| DE | 69623044 | 1/1996 |
| DE | 10308327 | 9/2004 |
| DE | 102011101635 | 11/2012 |
| DE | 112011102365 | 4/2013 |
| EP | 0105099 | 4/1984 |
| EP | 2447743 | 5/2012 |
| EP | 2447744 | 5/2012 |
| WO | WO03059643 | 7/2003 |
| WO | WO2013053435 | 4/2013 |
| WO | WO2013060817 | 5/2013 |

* cited by examiner

Fig. 9a  Fig. 9b

OPTICALLY VARIABLE ELEMENT

This application claims priority based on an International Application filed under the Patent Cooperation Treaty, PCT/EP2014/059238, filed on May 6, 2014, and German Application No. DE 102013105246.0, filed on May 22, 2013.

BACKGROUND OF THE INVENTION

The invention relates to an optically variable element, in particular an optically variable security element, as well as a method for the production thereof.

An optically variable element is known from WO 03/059643 A1, in which a first layer made of a first, high-refractive-index material is embedded in a second, low-refractive-index material. The two respective boundary surfaces of the first layer with the second material are formed as a relief structure. A diffraction grating is provided by this. The diffraction grating is to have a grating period of at most 500 nm. A waveguide which has the form of a continuous sine wave is thus obtained in the second material. Zero-order diffraction thereby occurs, namely under illumination a color is generated which is dependent on the angle of rotation and/or the angle of illumination.

The angle of rotation and the angle of illumination are here defined in respect of a rotation which takes place in a plane ("paper plane") defined by the optically variable element formed flat. The definition thus relates to a rotation about a normal to the surface of the optically variable element.

In the case of a rotation in the plane of the optically variable element the viewing angle thus changes (under constant illumination). A first area of the optically variable element from WO 03/059643 A1 can thus generate a first color at a first viewing angle. A second area can generate the first color at a second viewing angle. The area which in each case generates the first color changes in the case of rotation through 90°.

EP 0 105 099 A1 discloses an optically variable element which uses first- and higher-order diffraction structures and in which successive areas along a predefined path emit colored illumination in succession in the case of rotation in the paper plane, with the result that the colored area appears to jump along this path.

SUMMARY OF THE INVENTION

The object of the invention now is to specify an optically variable element which is characterized by improved optical properties.

This object is achieved by an optically variable element, in particular an optically variable security element, wherein the optically variable element has at least one first diffraction grating and at least one second diffraction grating with a grating period in each case from the range of between 100 nm and 500 nm, preferably of between 180 nm and 420 nm, wherein the first diffraction grating and the second diffraction grating are designed or formed such that either a) at a predetermined angle of rotation defined in respect of a rotation about a normal to a surface of the optically variable element and at a predefined angle of illumination a first color is generated by the first diffraction grating and a second color, different from the first color, is generated by the second diffraction grating, wherein the respective azimuth angles of the first and second diffraction gratings differ by at most 25°, preferably by at most 15° and particularly preferably by at most 9° or b) at a first angle of rotation defined in respect of a rotation about a normal to a surface of the optically variable element and at a predefined angle of illumination a color is generated by the first diffraction grating on the basis of light with wavelengths from the range of between 430 nm and 690 nm and a color is generated by the second diffraction grating on the basis of wavelengths which are either smaller than 430 nm or greater than 690 nm, and at a second angle of rotation defined in respect of the rotation and at the predefined angle of illumination a color is generated by the second diffraction grating on the basis of light with wavelengths from the range of between 430 nm and 690 nm and a color is generated by the first diffraction grating on the basis of wavelengths which are either greater than 690 nm or smaller than 430 nm.

The optically variable element can thereby provide either the effect of an, in particular almost continuous, migration of a color and/or the effect of a colored image flip.

The diffraction gratings in the optically variable element are preferably provided with a high-refractive-index dielectric first layer with a preferably constant thickness, which acts as a waveguide. Optionally, the diffraction gratings can also be provided with a layer sequence of high-refractive-index (H) and low-refractive-index (L) dielectric layers, e.g. a three-layered system HLH. A diffraction grating (according to a predetermined definition) has an azimuth angle. In the case of a linear grating there is a marked direction along which a sequence of peaks and valleys is provided. The azimuth angle describes at what angle the lines along which peaks and valleys of the grating succeed one another stand in relation to a reference line which runs in the flat plane from which the peaks and valleys extend vertically. In the case of a crossed grating, although there are two marked directions along which there is a sequence of peaks and valleys, it is possible to select one of these directions in order to use it to define the azimuth angle.

In the optically variable element according to the invention the two diffraction gratings show a color effect in different ways, with the result that any effects can be achieved by a skillful arrangement of the diffraction gratings. In particular the arrangement is to be designed such that by rotation of the optically variable element in its paper plane (or substrate plane) either an almost continuous migration of a color or a colored image flip occurs which is particularly striking and memorable for the observer. Such security features cannot be copied with current copying devices because of the small grating period—they are so-called subwavelength gratings. They can be formed opaque or transparent and e.g. can be used both on banknotes and in identification documents.

In a first aspect of the invention the optically variable element comprises at least three zones which succeed one another in at least one lateral direction (defined in the substrate plane), wherein each zone has a diffraction grating, of which the first zone has the first diffraction grating, the second zone has the second diffraction grating and the third zone has a third diffraction grating, different from the first and second diffraction gratings, wherein the diffraction gratings belonging to in each case two zones succeeding or neighboring one another in the at least one lateral direction differ in that i) their azimuth angles differ by at least 0.1° and at most 15°, preferably by at least 0.1° and at most 9° and/or ii) their grating periods differ by a value from the range of from 1 nm to 10 nm, wherein for at least three successive zones of the zones the respective value for the azimuth angle and/or the grating period changes in the same direction (thus either upwards or downwards), preferably in each case by the same amount in the case of successive zones.

In other words the azimuth angle and/or the grating period varies/vary a little in each case from zone to zone. Each rotation (in the plane of a substrate of the optically variable element) thereby has the result that the viewing angle changes. Thus, for instance, in the case of the generation of a first color by a first zone and subsequent rotation, this first color is generated in the second zone neighboring the first zone, then in the third zone neighboring the second zone, etc. The effect of an (almost) continuous migration of the first color is thereby generated. However, as this is a suitably designed zero-order diffraction, in each case all successive zones remain colored in the color predefined by the optical conditions. Thus the effect of an almost continuous shift of all colors within the sequence of the zones is achieved. However, the diffraction gratings can also be chosen such that some of the zones become invisible to the naked human eye, as the reflected color migrates into the UV-A spectral region or near-IR spectral region.

The optically variable element preferably comprises at least four, further preferably at least five and particularly preferably six zones, which succeed one another in at least one lateral direction (defined in the substrate plane), wherein each zone has a diffraction grating, wherein the diffraction gratings belonging to in each case two zones succeeding or neighboring one another in the at least one lateral direction differ in that
  i) their azimuth angles differ by at least 0.1° and at most 15° and preferably by at least 0.1° and at most 9° and/or
  ii) their grating periods differ by a value from the range of from 1 nm to 10 nm.

The successive zones preferably adjoin one another directly, in particular without an interspace that can be resolved by the naked human eye.

By color is meant an individual visual (sensory) perception which is brought about by light which lies in the range that is visible to the human eye or in the adjacent ranges ultraviolet A and near-infrared. This perception is also called color perception or color impression. The colors visible to humans lie in the range between 380 nm [violet] and 780 nm [deep red] of the electromagnetic spectrum, wherein the relative sensitivity of the eye below 430 nm and above 690 nm is less than 1% of the maximum value at 555 nm. As a result only very strong light sources, such as e.g. ultra bright LEDs or lasers, are perceived in the spectral ranges 380 nm-430 nm and 690 nm-780 nm. The color, as what is perceived, forms due to the visual stimulus in color receptors in response to a color stimulus specification. Color is not the property of the light seen (color stimulus), rather it is the subjective sensing of the physical cause of the electromagnetic waves. Corresponding to the spectral color stimulus specification (different intensity in the light of different wavelengths or also in the radiation neighboring the light, ultraviolet A or near-infrared), different color stimuli are brought about which form different qualities of the color perception, with the result that different colors are consequently perceived. A spectral color is the color impression that forms due to monochromatic light in the visible part of the light spectrum. In each case it is the most intense, therefore the purest, color. Examples of spectral colors are a monochromatic laser with the wavelength of 473 nm in the case of blue, a monochromatic laser with the wavelength of 532 nm in the case of green and correspondingly a monochromatic laser with the wavelength of 635 nm in the case of red.

The azimuth angle is always specifiable when the diffraction grating is not rotationally symmetrical. This is usually the case with the conventionally provided linear gratings, crossed gratings or hexagonal gratings. The crossed or hexagonal gratings can have identical or also different grating periods $d_x$ or $d_y$ in the two different grating directions.

In the case of the linear grating there is a marked direction along which a sequence of peaks and valleys is provided. The azimuth angle is an angle defined relative to this marked direction. In the case of the crossed grating, although there are two directions along which there is a sequence of peaks and valleys, it is possible to select one of these directions in order to use it to define the azimuth angle.

The azimuth angles, defined in such a way, of the diffraction gratings of successive zones preferably differ by an amount between 0.1° and 15°, in particular by an amount between 0.2° and 10°, particularly preferably by an amount between 0.5° and 5°. In the case of the named values a continuous migration of a color is perceived to an ever increased extent.

In a preferred embodiment for this first aspect the grating periods of two diffraction gratings of successive zones differ by a value from the range of from 1 nm to 7 nm, preferably from the range of from 1 nm to 5 nm, wherein the grating period is e.g. between 340 nm and 400 nm, e.g. 380 nm in the case of the first diffraction grating, 377 nm in the case of the second diffraction grating, etc. Even at these values the impression of a continuity is received to an increased extent in a shifting of the color perceived on the optically variable element.

In all named embodiments for the first aspect one or more of the zones and particularly each of the zones preferably has a dimension in two lateral directions in each case of more than 0.5 mm, preferably a dimension in at least one lateral direction of more than 1 mm, here particularly preferably of more than 3 mm. In addition or alternatively the feature can be implemented that one or more and in particular each of the zones has a dimension in two lateral directions in each case of at most 50 mm.

The named dimensions are such that when the optically variable element is observed from a suitable distance (e.g. from a reading distance of 30 cm) a zone seen as a whole can still be visually resolved, but the optically variable element is not too large overall.

In all embodiments named up to now for the first aspect the zones can form a rectilinear or curved band. A migration of the same color(s) along the arrangement of zones, thus along the band, is perceived.

Alternatively or in addition successive zones can in each case have the form of a curved band which is at least partially surrounded by in each case one other zone, succeeding the respective zone, in the form of a curved band, wherein preferably concentric closed bands and particularly preferably annular bands are provided by the zones. The effect achieved here is comparable to the effect of a pumping. Here, due to the specifications named for the first aspect in respect of the azimuth angle relative to the diffraction gratings or the grating period of the diffraction gratings, the impression of a color effect moving continuously from inside to outside or from outside to inside is ensured when the optically variable element according to the invention is rotated or tilted. This pumping effect can also be perceived as a quasi-expansion or quasi-contraction of a contour of a motif.

In all embodiments named up to now for the first aspect one or more zones can comprise a plurality of first areas and second or second and third or second, third and further areas which provide a different optical effect from the first areas, wherein in the first areas, in each case, the same diffraction grating is formed from the first diffraction grating, the second diffraction grating, the third diffraction grating or a further diffraction grating.

An interlacing of the areas in particular thereby ensures that the first areas and the second, third and/or further areas are not perceived as discrete, and possibly cannot be resolved by the naked human eye (at a suitable size). In particular, several optical effects can be brought to bear in a color effect region (or subregion of same). For this it is preferably provided that the first areas and/or the second areas and/or the optionally present third and/or further areas have a dimension in a first lateral direction of less than 300 μm, preferably of between 50 μm and 200 μm.

In a first variant of this embodiment with the different areas the other optical effect consists of generating a color, dependent on a respective viewing angle and the predefined angle of illumination, which at least for a range of angles of rotation and illumination differs from the color which is generated in each case by the first areas. As a whole there is thus a polychromatism which can occur either successively or at the same time in the case of rotation in the plane of the optically variable element. Such effects are particularly attractive and at the same time have a high level of protection against forgery.

In a variant of the embodiment with the different areas it can be provided that the other optical effect is based on another physical principle. In particular, it is true here that in second or third or further areas microstructures different from the diffraction gratings (or relief structures) formed in the first areas are provided, in particular isotropically or anisotropically scattering mat structures, holograms, diffraction gratings with a spatial frequency of between 300 lines/mm and 1800 lines/mm and/or diffractive diffraction gratings which imitate freeform surfaces, and/or in particular refractively acting macrostructures, such as facet surfaces or freeform surfaces, and/or a TRUSTSEAL® and/or a KINEGRAM®.

Isotropically scattering mat structures are characterized by irregularly arranged microstructures, wherein the lateral size of the microstructures typically fluctuates around an average value. The average diameter of the microstructures here typically lies in the range of from 1 μm to 50 μm. The larger part of the microstructures is almost rotationally symmetrical. The average diameter sets the scattering angle up to which the light is deflected from direct reflection. The light here is scattered equally strongly for all angles of rotation φ (at a constant angle of illumination Θ), whereby the isotropic brightness impression forms.

Anisotropically scattering mat structures are likewise characterized by irregularly arranged microstructures, wherein the lateral size of the microstructures fluctuates around an average value. The average diameter of the microstructures here again typically lies in the range of from 1 μm to 50 μm. Unlike the isotropically scattering mat structures, however, the larger part of the microstructures is not rotationally symmetrical, but rotationally asymmetrical, e.g. elongate. In other words the average diameter of the microstructures in one lateral direction clearly differs from the average diameter in the second lateral direction perpendicular thereto. For example, the average diameter in one lateral direction can be at least twice as large as the average diameter in the other lateral direction. For example, the microstructures can be designed cigar-shaped. The different average diameter in the two lateral directions leads to different-sized scattering angles up to which the light is deflected from direct reflection. As a result the light is scattered to different extents when the viewing angle or angle of rotation φ is varied, whereby the anisotropic brightness impression forms.

In particular, if the other optical effect provided by the second and optionally further areas is based on another physical principle or quite different microstructures are provided, it is preferably provided that in one or more, and preferably all, zones the first areas occupy at least 50% of the surface area covered by the respective zones, preferably between 50% and 90%, particularly preferably between 60% and 80%. It is hereby guaranteed that the color effect generated is visually recognized as the most important.

In all variants of the embodiment with the different areas it is preferably provided that the other optical effect, when the angle of rotation and/or angle of illumination is changed, consists in the appearance of a movement of an optical property which is in the same direction as or in the opposite direction to the appearance of a movement of the color generated by the first areas along the successive zones. In other words a movement effect is also produced by the other optical effect. If it is in the same direction as the appearance of the movement of the color generated, then the latter effect is strengthened. If it is in the opposite direction, then an interesting optical effect is ensured.

In a second aspect of the invention fourth and fifth grid areas are at least partially interlaced in one another, forming a one- or two-dimensional grid, wherein the at least one first diffraction grating is provided in the fourth grid areas and the at least one second diffraction grating is provided in the fifth grid areas. The interlacing ensures that different effects are generated in the same area of the optically variable element.

Suitable choice of the parameters can ensure e.g. that a respective color is generated with a first intensity by the first diffraction grating and the second diffraction grating in a predetermined range of angles of rotation at a predefined angle of illumination, and outside this range of angles of rotation at a predefined angle of illumination electromagnetic radiation from the range of visible light is only generated with a second intensity which is at most one third, preferably at most one fifth and particularly preferably at most one tenth of the first intensity. In this way the visual effect of the disappearance of an item or object represented by the respective diffraction grating can be achieved in the case of rotation in the substrate plane of the optically variable element.

Outside the predetermined range of angles of rotation a color from the range of ultraviolet A or near-infrared is in particular generated, by the respective diffraction grating, with an intensity which is necessarily at least 50% of the first intensity. If, within the framework of the present application, a color is mentioned (in particular if it is generated by wavelengths which are either smaller than 430 nm or larger than 690 nm), the case described here is also meant that the second intensity active here is at most one third, preferably at most one fifth and particularly preferably at most one tenth of the first intensity, at which a color is clearly visible. In the present case the term color thus also includes a sensory impression of the eye that is only weak, barely noticeable.

In an exemplary case the fourth grid areas on the one hand and the fifth grid areas alone or with sixth or with sixth and further grid areas on the other hand represent different items, wherein an item is a motif, in particular a geometric shape, a pattern, a symbol and/or an alphanumeric character, and/or an image background. Here it is intentionally ensured that more than just one item is represented, wherein the interlacing of the different grid areas ensures that these different items ultimately appear to be present in the same partial area of the optically variable element.

In the last-named embodiment it is preferably provided that an identical color is generated for two different items at at least a first angle of rotation relative to a predefined angle of illumination, despite the different properties (different grating parameters) of different diffraction gratings, and not generated at a second angle of rotation relative to the predefined angle of illumination (namely different colors are generated by different grid areas, or individual grid areas remain quite invisible). In this way, in particular, at the first angle of rotation and the predefined angle of illumination the effect can be achieved that a represented motif is invisible in front of an image background (as the motif and the background have a very similar or the same color), but which appears visually at the second angle of rotation relative to the predefined angle of illumination (as the motif and the background have a different color).

The fourth and/or fifth grid areas preferably have a dimension in at least one lateral direction of less than 300 µm.

In a third aspect of the invention a plurality of color regions are provided which are arranged according to a one- or two-dimensional grid and in each case form a picture element of a first motif, wherein the color regions have a combination of seventh and eighth or seventh, eighth and ninth partial areas, wherein the at least one first diffraction grating is provided in the seventh partial areas, the at least one second diffraction grating is provided in the eighth partial areas and at least one third diffraction grating is provided in the optionally present ninth partial areas.

In this third aspect the seventh, eighth and optionally ninth partial areas together generate a multicolored image visible at at least one angle of rotation and predefined angle of illumination. Thus there is a cooperation of these different partial areas. Here the diffraction gratings in the partial areas preferably differ in terms of the grating parameters grating period and/or azimuth angle and/or grating depth, while the average thickness of the first layer is identical.

One or more of the color regions preferably have a dimension in each lateral direction of at most 300 µm, preferably of between 50 µm and 200 µm. In this way the color regions cannot or can only barely be resolved by the naked human eye at a predetermined distance of e.g. 30 cm. These are then particularly suitable as pixels (from "picture elements").

It can alternatively be provided that one or more of the color regions have a dimension in one lateral direction (thus defined in the substrate plane of the optically variable element) of less than 300 µm, preferably of less than 80 µm and have a dimension in a second lateral direction of more than 300 µm, preferably more than 1 mm. In this way an image can be made up of strip-shaped elements. Interesting optical effects can be achieved hereby. In particular, if the multicolored image is visible as a true-color image when observed along these strips, but is no longer visible as a true-color image when observed perpendicular to the strips, an interesting optical effect is achieved in the case of the named dimensions.

In particular, a multicolored image can be generated by the color regions at a first angle of rotation and a predefined angle of illumination and a monochromatic image can be generated by the color regions at a second angle of rotation and the predefined angle of illumination. This can, again, occur due to the procedure that in the case of rotation individual partial areas emit electromagnetic radiation in a spectrum the reflection peak of which lies beyond the range of visible light.

In all embodiments of the invention named up to now it can be provided that the at least one first diffraction grating and the at least one second diffraction grating are superimposed on a blazed grating. In particular, if the blazed grating is low-frequency and more than two, preferably more than five periods of the diffraction grating are provided per period of the low-frequency blazed grating, the arrangement of the diffraction gratings on a side of a blazed grating ensures that a color impression which is normally to be seen in the case of perpendicular observation appears instead at, for instance, an illumination and viewing angle of from 20° to 30°, depending on the structure depth of the low-frequency blazed grating, which can lie e.g. in the range of from 500 nm to 5000 nm.

The asymmetry of the low-frequency blazed gratings has the result that when the optically variable element is rotated through 180° the surface normals of the diffraction grating are in each case oriented differently and a respectively different color impression forms at an angle of rotation of 0° and of 180° and at an illumination and viewing angle of from 20° to 30°. For example, at an angle of rotation of 0° a diffraction grating on a flat substrate, i.e. without superimposition with a low-frequency blazed grating, on the one hand and a diffraction grating on an inclined side of a low-frequency blazed grating (i.e. with superimposition) on the other hand can have the same or a very similar color, wherein in the case of rotation through 180° both diffraction gratings then have clearly different color impressions compared with one another at an illumination and viewing angle of from 20° to 30°.

In a preferred embodiment for the first, second and also the third aspect the optically variable element has a first layer made of a first material and a second layer made of a second material, wherein the first diffraction grating and the second diffraction grating are provided by an (in particular diffractive) relief structure which is formed on the boundary surface of the first layer with the second layer.

Here, in particular, the first material is to be a high-refractive-index material and embedded in the second layer, wherein the second material (in the spectral range visible to the naked human eye) has a refractive index that is lower by at least 0.2, preferably at least 0.5, with the result that a waveguide in the manner of the waveguide described in WO 03/059643 A1 is provided. Here, high-refractive-index means a first material with a refractive index in the visible spectral range (typically at a wavelength of approx. 635 nm) of more than 1.7. Examples of such high-refractive-index first materials are listed in Table 1. The numerical values are only rough guide values, as the refractive index of a layer existing in practice depends on many parameters, such as crystal structure, porosity, etc.

TABLE 1

| Material | Empirical formula | Refractive index n |
| --- | --- | --- |
| Lead sulfide | PbS | 4.33 |
| Zinc telluride | ZnTe | 3.04 |
| Silicon carbide | SiC | 2.64 |

TABLE 1-continued

| Material | Empirical formula | Refractive index n |
|---|---|---|
| Iron oxide | $Fe_2O_3$ | 2.92 |
| Barium titanate | $BaTiO_3$ | 2.41 |
| Titanium dioxide (refractive index is dependent on the crystal structure) | $TiO_2$ | >2.4 |
| Zinc sulfide | ZnS | 2.35 |
| Niobden oxide | $Nd_2O_5$ | 2.32 |
| Zirconium oxide | $ZrO_2$ | 2.21 |
| Tantalum pentoxide | $Ta_2O_5$ | 2.2 |
| Zinc oxide | ZnO | 2.1 |
| Silicon nitride | $Si_3O_4$ | 2.02 |
| Indium oxide | $In_2O_3$ | 2.0 |
| Silicon monoxide | SiO | 1.97 |
| Hafnium oxide | $HfO_2$ | 1.91 |
| Yttrium oxide | $Y_2O_3$ | 1.9 |
| Aluminum oxynitride | AlON | 1.79 |
| Magnesium oxide | MgO | 1.74 |

Alternatively the high-refractive-index first material consists of a so-called hybrid material which consists of metal oxide polymers or nanoparticles of high-refractive-index material embedded in an organic matrix. For example this hybrid material can consist of a mixture of poly(dibutyl titanate) polymer and poly(styrene allyl alcohol) copolymer.

Preferably it pertains here that the first material has a refractive index of more than 1.8, further preferably of more than 2.0. This is the case for example with zinc sulfide and titanium dioxide.

Such a first material can be embedded in a low-refractive-index second material. Low-refractive-index means a second material with a refractive index in the visible spectral range (typically at a wavelength of approx. 635 nm) of less than 1.7 and preferably less than 1.6. Examples of such low-refractive-index materials are listed in Table 2. The numerical values are only rough guide values, as the refractive index of a layer existing in practice depends on many parameters, such as crystal structure, porosity, etc.

TABLE 2

| Material | Empirical formula | Refractive index n |
|---|---|---|
| Poly(ethylene terephthalate) (PET) | $(C_{10}H_8O_4)_n$ | 1.64 |
| Polystyrene (PS) | $(C_8H_8)_n$ | 1.59 |
| Polycarbonate (PC) | — | 1.58 |
| Polyvinyl chloride (PVC) | $(C_2H_3Cl)_n$ | 1.54 |
| Plexiglass (PMMA) | $(C_5O_2H_8)_n$ | 1.49 |
| Polyacrylate | — | 1.49 |
| Cellulose | $(C_6H_{10}O_5)_n$ | 1.47 |
| Glass | $SiO_2$ | 1.46 |
| Magnesium fluoride | $MgF_2$ | 1.38 |
| Polytetrafluoroethylene (PTFE) | $(C_2F_4)_n$ | 1.35 |

The first material can preferably be embedded in a second material made of a polymer, which second material has a refractive index of between 1.4 and 1.6, e.g. of 1.5.

The value of the profile depth of the relief structure is preferably between 50 nm and 500 nm, particularly preferably between 80 nm and 250 nm.

Furthermore, the profile of the relief structure is preferably sinusoidal, rectangular or provides a blazed grating, wherein it can in particular be sawtooth-shaped.

The constantly identical or at least average thickness of the first layer preferably lies between 30 nm and 300 nm, particularly preferably between 50 nm and 200 nm. In a particularly efficient way a non-rotationally symmetrical diffraction grating with the desired optical properties (achievement of a zero-order diffraction effect) can hereby be provided. The named layer thickness is suitable in particular when a waveguide which is embedded in the second layer is to be provided by the first layer.

In all those embodiments in which the first material is embedded in the second material, with the result that a waveguide in the manner of that described in WO 03/059643 A1 is formed, the following procedure is preferably additionally implemented: in the color effect region first material which is embedded in the second material, but without a zero-order diffractive relief structure being formed on a boundary surface, is likewise provided outside the zones, wherein the first material is removed at least in areas and/or wherein a metal layer is applied at least in areas.

The removal of the (in particular high-refractive-index) first material ensures that no zero-order diffraction occurs in the respective areas, thus no color at all is perceived. Thus, in the case of a suitable shaping for the named areas for instance in the form of geometric shapes, patterns, symbols and/or alphanumeric characters, an additional security feature can be provided.

A protection against forgery is also ensured to an increased extent by a specific application of the metal layer in the form of structures (geometric shapes, patterns, symbols and/or alphanumeric characters).

In all named embodiments a color layer is preferably provided, in particular underneath the first layer, optionally also underneath the second material in which the first layer is embedded, wherein the color layer is preferably dyed dark, in particular black or dark gray, dark green, dark blue or dark red and preferably has a patterned shaping. For example the color layer can be molded in the form of a further motif or item. Through the use of such a color layer it is possible to strengthen the contrast strength in the case of the provision of the color effect in the color effect region and for example hereby to personalize and/or alter the image being displayed to the observer by a patterned design of this layer. This contrast strengthening takes place in particular by absorption of light components which pass through the other layers and would otherwise be reflected and scattered at a brighter substrate surface, wherein this scattered light would be reflected and the optically variable effect or the color effect thereof would weaken. The color layer can be a dyed varnish layer, adhesion-promoter layer or adhesive layer. For example the color layer can be a varnish highly filled with pigments made of carbon black or graphite or dioxazine violet. Highly filled, in this connection, means that the pigment proportion in the varnish is comparatively high, in particular is approximately 5% to approximately 40%. However it can also be applied before the varnish layer, adhesion-promoter layer or adhesive layer and in this case in particular can be applied partially—e.g. in the form of a logo. Furthermore, the color layer can be used to reference the color movement effect, i.e. the color layer, as an optically static element, can serve as orientation guide or reference point for the human eye when the optically variable effects according to the invention are observed.

The object is also achieved by a method for the production of an optically variable element which in a first area has at least one first color region which under illumination generates a color dependent on an angle of rotation defined in respect of a normal to a surface of the optically variable element and on a predefined angle of illumination defined in respect of this rotation, wherein a diffraction grating is provided in each case in two or more partial areas, arranged next to one another, of the color region which have in each case a width or length dimension of less than 300 μm, wherein in predetermined partial areas a first diffraction grating is provided which under illumination at a particular angle of illumination and at a particular angle of rotation generates a first color which differs from at least one color which is generated under illumination at the particular angle of illumination at the particular angle of rotation in at least one of the other partial areas of the first color region by the diffraction grating provided there.

The features according to the first, second and third aspects can also be implemented in combination in one optically variable element.

BRIEF DESCRIPTION OF THE DRAWINGS

Preferred embodiments of the invention are described in more detail below with reference to the drawings, in which FIGS. 7a-7c illustrate a fifth embodiment example of the invention in top view in which two different items are provided, wherein FIGS. 9a-9c illustrate a seventh embodiment example of the invention in top view which is a modification of the fifth embodiment example, for which

DETAILED DESCRIPTION OF THE INVENTION

Embodiment examples of optically variable elements in which a color change is achieved in the case of rotation are explained below.

Figure 1:
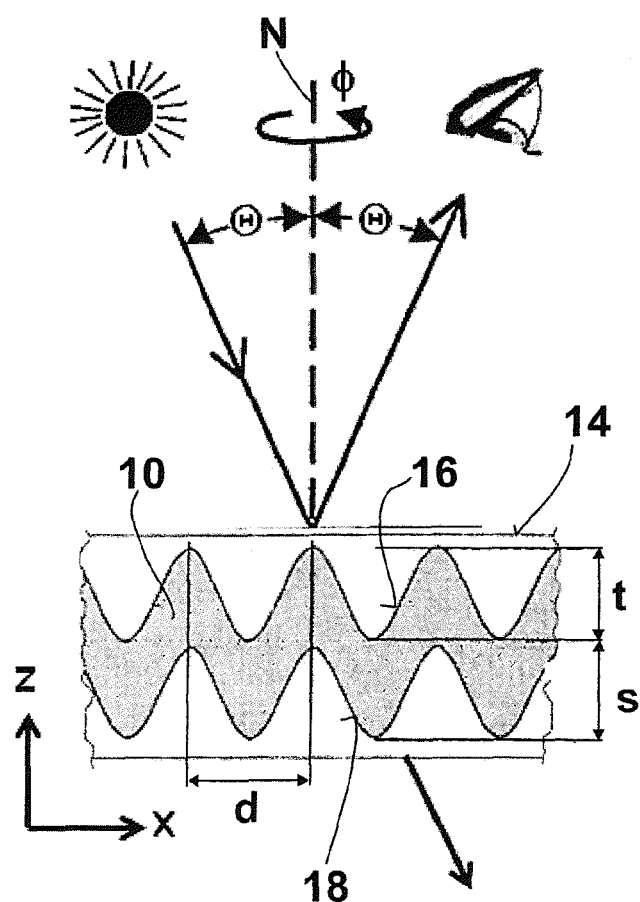
FIG. 1 shows a cut, not to scale, through a section of an optically variable device according to a structure such as is used in the invention.

The basic layer structure of such an optically variable element can be seen from FIG. 1.

A first layer 10 made of a high-refractive-index material such as, for example, zinc sulfide (ZnS) or titanium dioxide ($TiO_2$) is embedded in a polymer which is of low refractive index, e.g. has a refractive index of 1.5. The polymer forms a second layer labeled 12 in FIG. 1 and has a flat surface 14. In contrast the boundary surface 16 between the first layer 10 and the polymer 12 is formed as e.g. a diffractive relief structure, likewise also the boundary surface 18 on the underside. The boundary surfaces 16 and 18 show relief structures which run substantially parallel to one another, with the result that the first layer 10 has an average layer thickness s. This layer thickness of the first layer 10 acting as waveguide layer is typically, on average, between 30 nm and 300 nm, preferably between 50 nm and 200 nm. The relief depth (relief depth=distance between "peak" and "valley" of the relief structure) at the two boundary surfaces 16 and 18 can be identical, but need not be. A sinusoidal shape of the diffractive relief structure by which a diffraction grating is provided is shown in FIG. 1. (Alternatively a rectangular shape or an asymmetrical shape, e.g. a sawtooth, can also be provided for the provision of a blazed grating and the like.) The diffraction grating has a grating period d from the range of between 100 nm and 500 nm, preferably of between 180 nm and 420 nm. If the relief depth t has a value of between 50 nm and 500 nm and preferably between 80 nm and 250 nm, the effect of the zero-order diffraction is, as known for instance from WO 03/059643 A1, shown: at an angle of incidence Θ a part of the light is diffracted into the zero order, with the result that light strikes the eye of an observer at an angle of emergence of likewise Θ. In other words, the color impression occurs at an angle of illumination (or angle of incidence) equal to the angle of emergence or in direct reflection. The angle Θ is typically greater than or equal to 10°, preferably smaller than 45° here. Another part of the light is transmitted. As there is typically almost no absorption in the first layer, the effects described below in reflection, of the almost continuous migration of a color or a colored image flip, are also present analogously in transmission. As the light of different wavelengths is diffracted with different intensity into the zero order, the optically variable element appears colored. The color depends here on the viewing angle or angle of rotation φ. (It can also depend additionally on the angle of illumination here.) The viewing angle φ is defined in the present case as the angle of rotation about a normal N perpendicular to the flat surface 14 of the first material 12. Here a flat optically variable element is also a rotation in the plane thereof.

The diffraction grating can be a linear, crossed or hexagonal grating or can assume even more complex shapes. In the following examples the starting point is a linear grating, relative to which an azimuth angle α is defined: this describes at what angle the lines along which peaks and valleys of the grating succeed one another stand in relation to a reference line which runs in the plane 14.

Figure 2A:
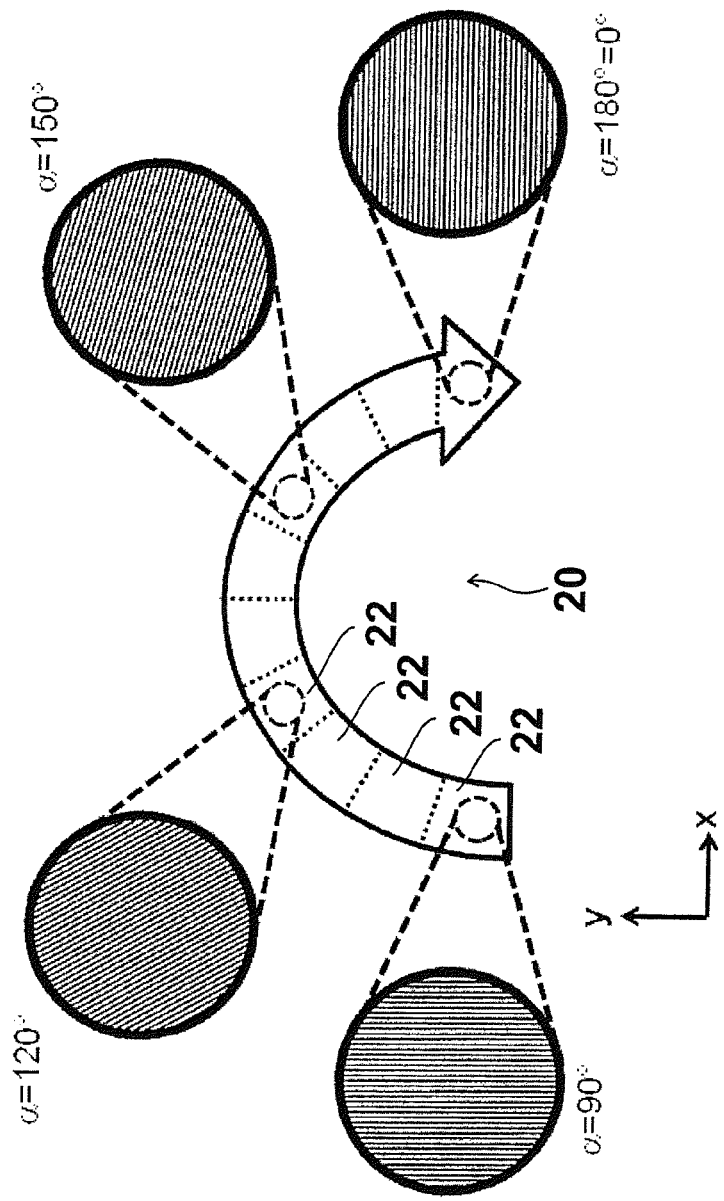
FIG. 2a shows a schematic representation of individual zones as a top view of a first embodiment example of the invention with enlarged partial sections.

In a first embodiment example according to FIG. 2*a* an arrow-shaped first area labeled 20 as a whole is provided in the plane of the (substrate of the) optically variable element spanned by the directions x and y, which is divided into several zones 22 succeeding one another in the sequence provided by a course of the arrow. A characteristic of this embodiment example is that a linear grating such as described with reference to FIG. 1 is arranged in each of the zones 22, but that the linear gratings of two neighboring zones differ in each case in terms of the azimuth angle α. However it is provided here that the azimuth angles in the case of two successive zones differ in each case by only 10°, thus by less than 15°.

Figure 2B:
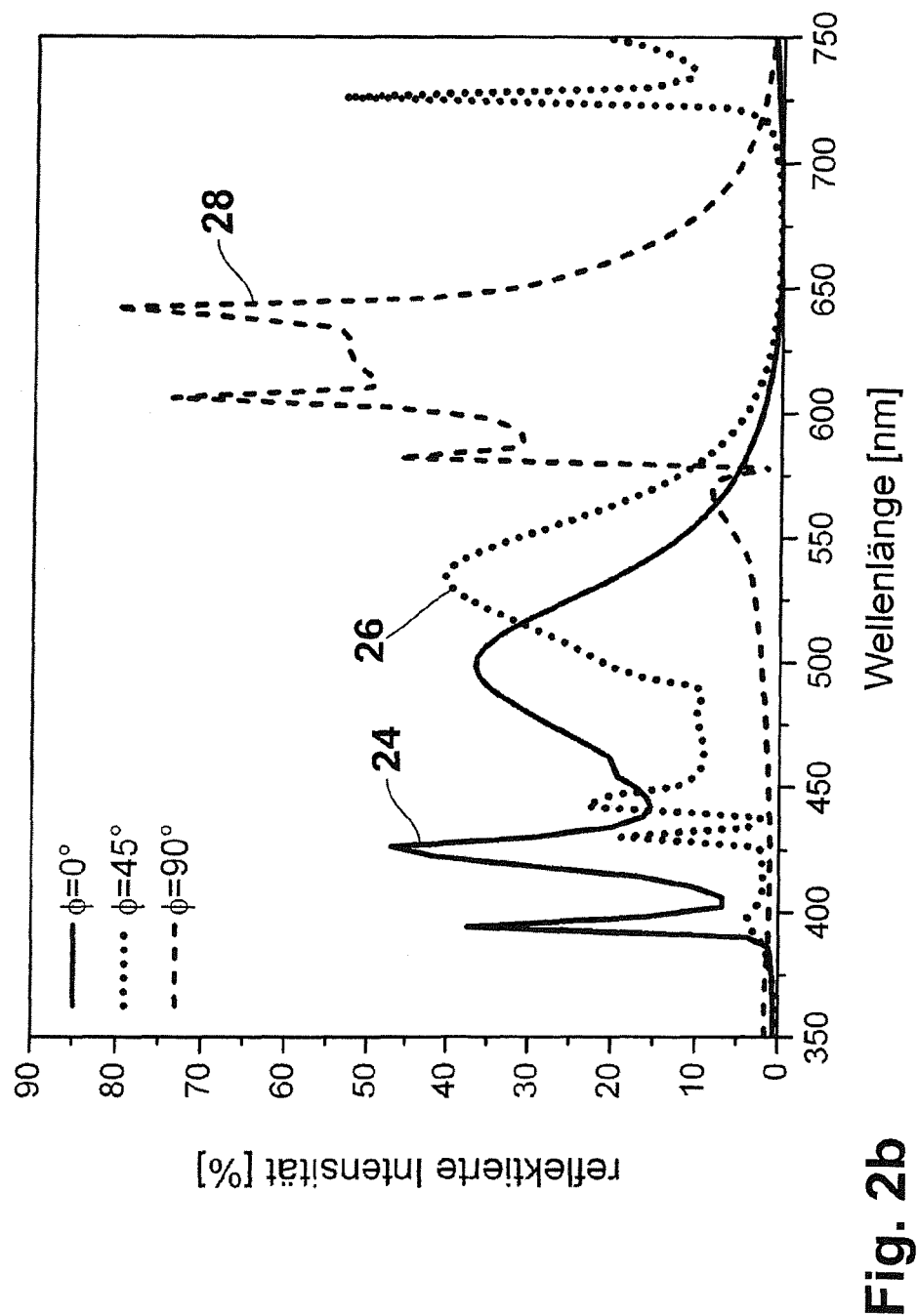
FIG. 2b illustrates several different reflection spectra applying to different angles of rotation, which are active for individual zones from the embodiment example according to FIG. 2a, FIGS. 2c-2e schematically illustrate the color effect achieved in the embodiment example according to FIG. 2a at different angles of rotation.

As a color effect produced by the linear grating is dependent on the viewing angle or angle of rotation φ, the different zones 22 appear in different colors. This can be explained using the reflection spectrum in FIG. 2*b*, where a first, continuous curve 24 shows the reflection spectrum at an angle of rotation of φ=0°, a second curve 26 (dotted) shows the corresponding reflection spectrum at an angle of rotation of φ=45° and the curve 28 (dashed) shows the corresponding reflection spectrum at an angle of rotation of φ=90°. All reflection spectra shown in the figures were calculated using the C method. The C method calculates the reflection and transmission spectra by designing the boundary surfaces of the diffraction grating flat by means of a transformation of the coordinate system. In other words, the grating structure is then concealed in the new coordinate system. A constraint of the C method is that the boundary surface (and thus the profile shape of the diffraction grating) must be described with a differentiable function f(x).

The named reflection spectra apply to a grating period of 380 nm, a grating depth of 150 nm, when zinc sulfide is used as first layer 10 in a thickness of 80 nm and is embedded in a polymer as material of the second layer 12 with a refractive index of approx. 1.5. Above all the reflection peak in the reflection spectra plays the determining role when the color impression is evaluated. In the curve 24 the broad peak lies at approx. 500 nm, in the case of the curve 26 the broad peak lies at approx. 540 nm and in the case of the curve 28 at approx. 630 nm. This corresponds to a color change from green, via light green, to deep red.

Figure 2C:
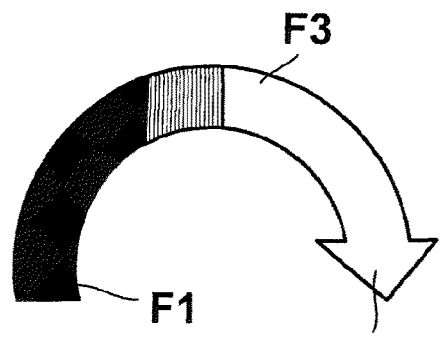
Figure 2D:
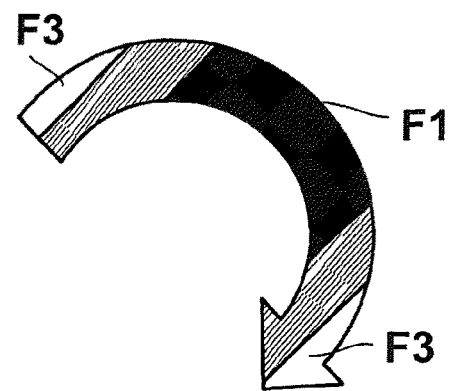
Figure 2E:
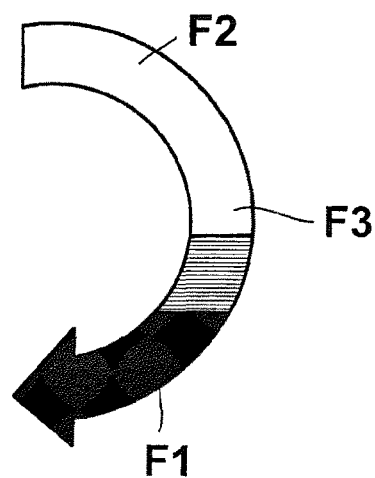

As explained using a black-and-white representation in FIGS. 2*c*-2*e*, in the starting position according to FIG. 2*c* (angle of illumination) Θ≈30° a part of the zones 22 (with α=90°) are therefore seen at the start of the arrow in a color F1 (for instance red), which passes over into the color F2 (for instance green) according to the spectrum up to the arrowhead. In-between, zones F3 are also present in light green. If the optically variable device is now rotated through 45°, according to FIG. 2*d* the color F1 (red) is seen in the center of the arrow, while the color runs to light green F3 at the end as well as at the head of the arrow. If it is now rotated further through a further 45°, thus through 90° in total, then a continuous color movement effect occurs in direct reflection for a multicolored arrow according to FIG. 2*e*, see the colors F2 and F1: the start of the arrow is green for instance, the arrowhead is red for instance. In total, in the case of rotation through 90°, a red color area migrates from the start of the arrow to the arrowhead.

Figure 3:
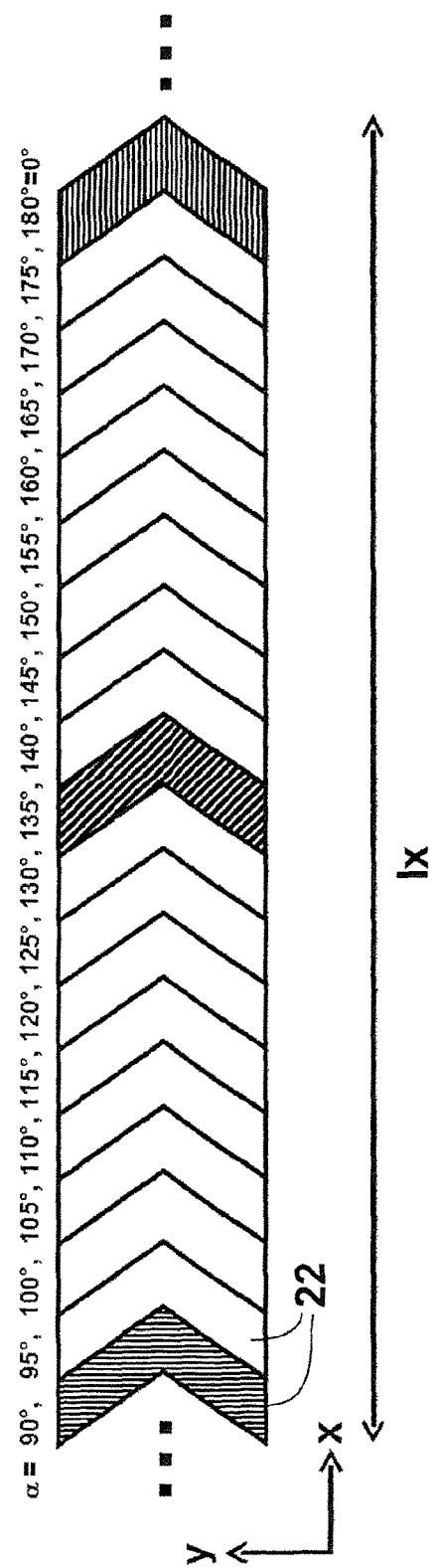
FIG. 3 shows a second embodiment example of the invention in a schematic section in top view.

In a second embodiment example shown in FIG. 3 several first zones 22 are in each case formed V-shaped and adjoining one another, and the azimuth angle of the linear diffraction grating varies from zone to zone in each case by 5°. The whole thing can be repetitive, i.e. can repeat anew again and again several times in the case of relatively small zones 22. In the case of linear gratings 180° corresponds again and again to the next start. However, there can also be a jump in the azimuth angle. For example, α=180° can again be followed by α=90° and then by α=95° etc. The length of a repetitive unit is labeled $l_x$. $l_x$ is preferably in the range of from 5 mm to 150 mm, in particular from 5 mm to 50 mm. When the optically variable element is rotated a movement color effect occurs, as if the peaks of the V shapes were indicating a direction.

Figure 4A:
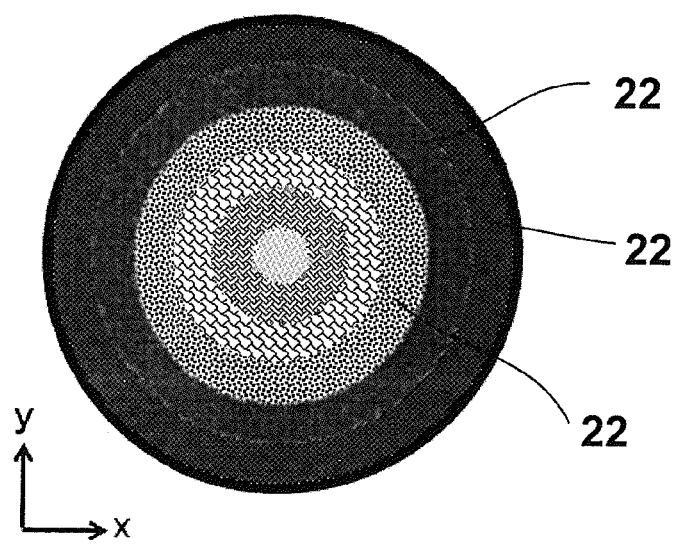
FIG. 4a and FIG. 4b illustrate a third embodiment example of the invention in the case of observation at different angles of rotation in its basic structure in top view and, for this.

In a third embodiment example first zones 22 are provided in the form of concentric rings. By way of example five rings concentric to one another around a central circle are shown in FIG. 4*a*. In a particular embodiment, for example, thirty-five concentric rings can be provided in which in each case linear gratings such as explained above using FIG. 1 are provided, wherein the linear gratings of two neighboring concentric rings differ in terms of their azimuth angle in each case by 5°.

Figure 4B:
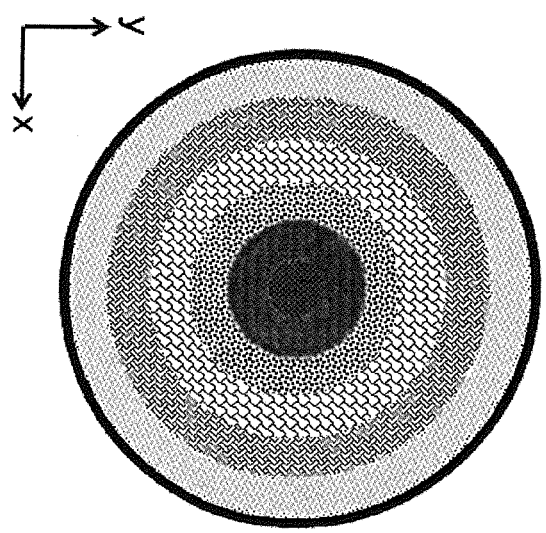

If, in the transition from FIG. 4*a* to FIG. 4*b*, the optically variable element and thus the linear gratings are rotated, then (cf. FIG. 4*c* and FIG. 4*d*) the effect of a continuous color movement from inside to outside (and then back from outside to inside), in the manner of a continuous pumping movement, results. Alternatively the diffraction gratings can be chosen such that the continuous color movement migrates into spectral ranges not visible to the naked human eye (UV-A or near-IR). For example the outer area of the element can be initially invisible and the color migrates from inside to outside in the case of rotation. The color movement can, naturally, also run in the reverse direction.

In the first to third embodiment example the azimuth angle is varied from zone 22 to the succeeding zone 22. The grating period could also be varied just as well, by a value which differs between successive zones by 1 nm to 10 nm, preferably by 1 nm to 7 nm, particularly preferably by 1 nm to 5 nm.

The effect produced using the first to third embodiment example can be combined with itself (with a different coloring) or with other effects. If it is desired to provide several optical effects combined on a limited surface in one optically variable effect, a gridding or interlacing is recommended.

Figure 5A:
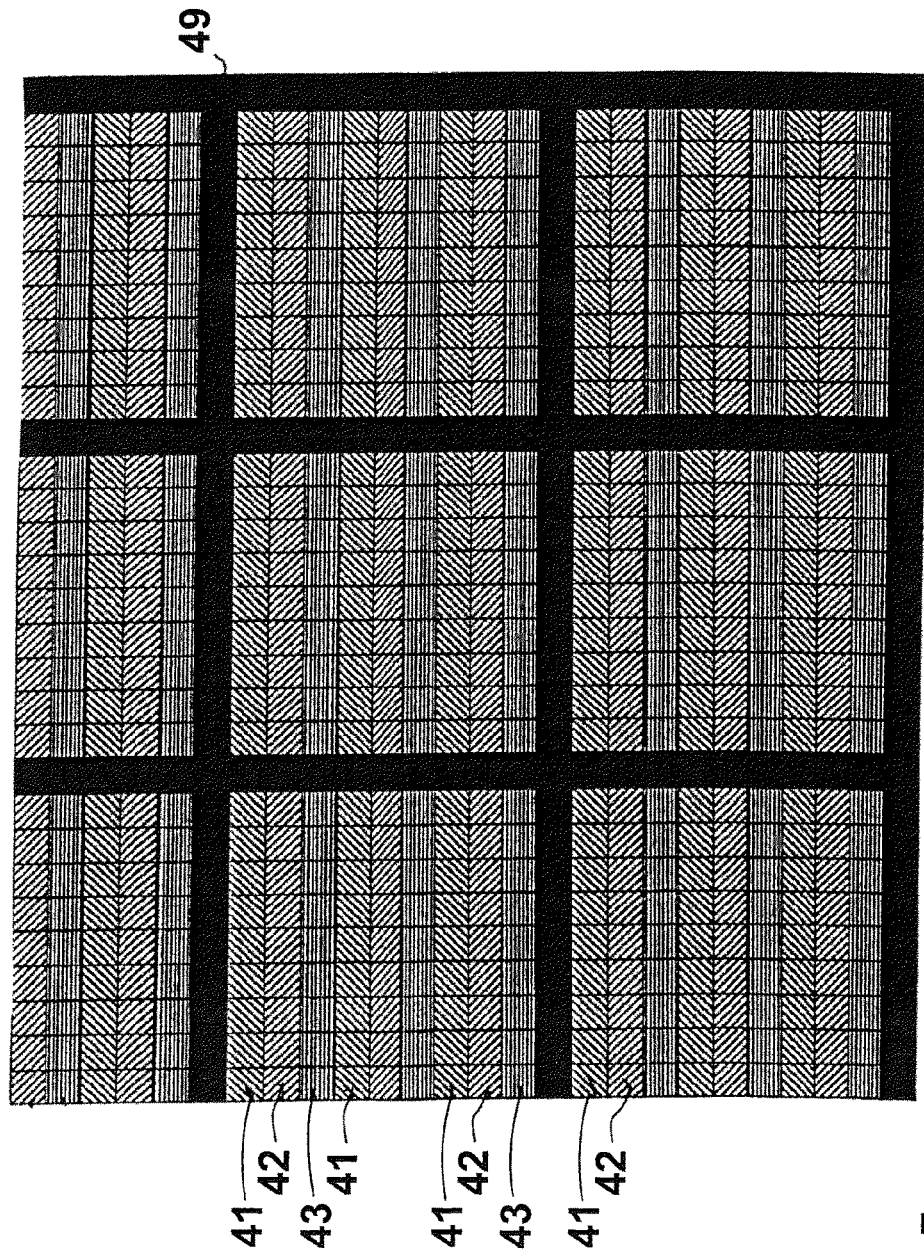
FIG. 5a illustrates an overall view in top view and FIG. 5b illustrates a partial view of a region in which a gridding of individual grid elements is provided.
Figure 5B:
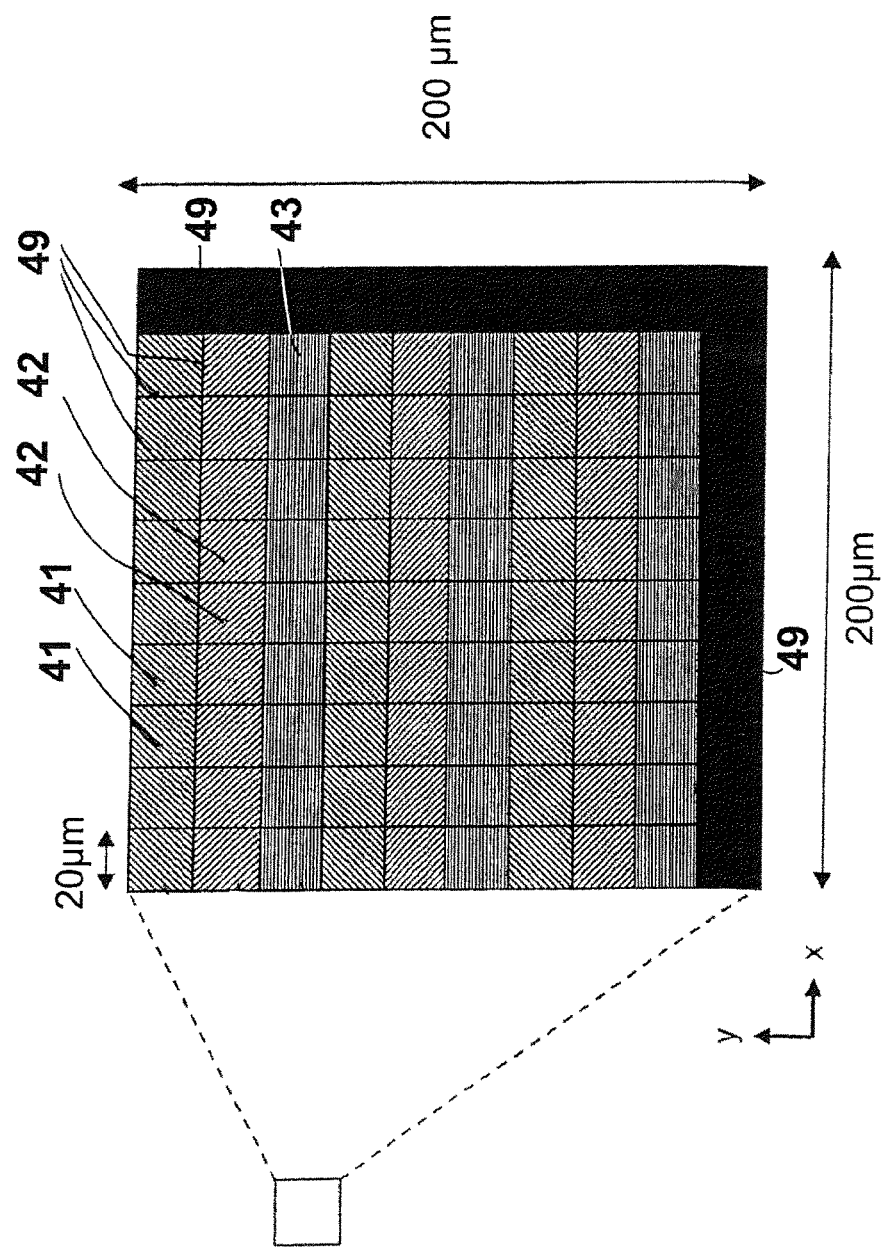

FIGS. 5*a* and 5*b* show the structure of the zones 22 through individual (grid) areas 41, 42, 43, which are interlaced in one another, in the present case e.g. such that first grid areas 41 are arranged next to one another along a line, underneath which second grid areas 42 are arranged along a second line and third grid areas 43 are arranged along a third line, then the first grid areas 41 are arranged again along a fourth line, etc. Additionally, bars 49 are optionally provided which have a width of approx. 15% of the grid areas 41 to 43. The optional bars 49 make it easier to separate the grid areas 41, 42, 43 or also different grid areas of the same type from one another, and in particular to provide different diffraction gratings or other structures in the different grid areas.

It is also possible for the bars 49 to at least partially frame, not the individual grid areas, but the whole zone 22. FIG. 5*b* shows a schematic top view of such a zone with different grid areas 41, 42, and 43. A bar 49 is provided which partially frames the zones 41, 42 and 43 on two sides in an L shape.

Different types of diffraction gratings can be provided in the first grid areas 41, 42 and 43, which differ from one another e.g. in terms of their azimuth angle or their grating period. Thus, with such different types of diffraction gratings, at a particular angle of illumination and rotation, a red, green and blue color can be generated by these grid areas 41 to 43. Alternatively only the grid areas 41 or only the grid areas 41 and 42 can also generate a color in each case, and the grid areas 43 can be covered with a quite different microstructure or macrostructure. If the dimensions of the individual grid areas are correspondingly small (e.g. between 5 µm and 100 µm large), then they cannot or can barely be resolved by the naked human eye at a predetermined distance (e.g. at a distance of 30 cm). An item can thereby be visible at the same point as another item, wherein the two items are in each case represented by different grid elements 41, 42, 43.

Figure 6:
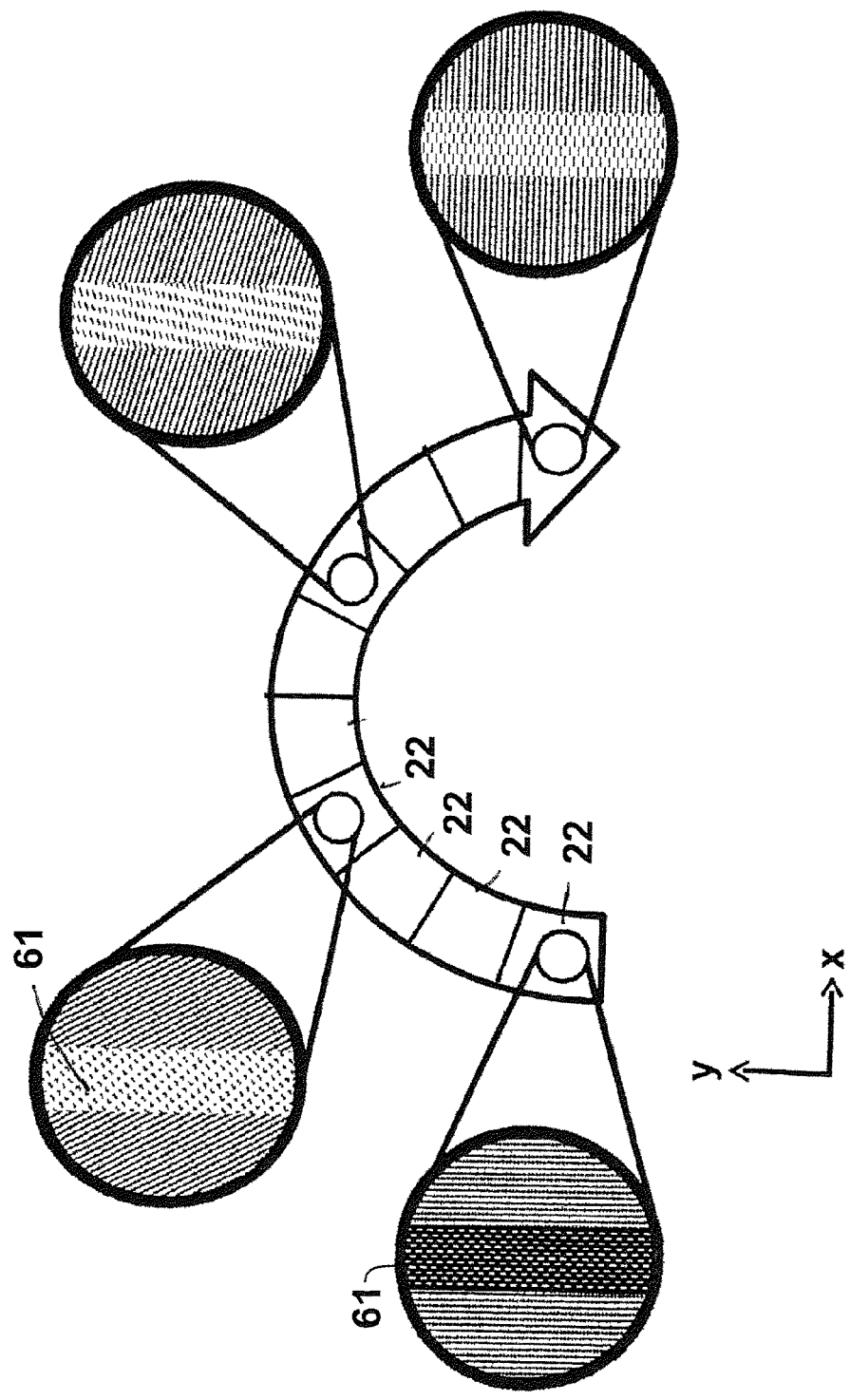
FIG. 6 illustrates a fourth embodiment example of the invention in top view in which, starting from the embodiment according to FIG. 2a, a gridding according to FIGS. 5a/b is effected with such grid areas which generate a different optical effect.

In a fourth embodiment example according to FIG. 6 the first embodiment example according to FIG. 2a is taken up: in the first zones 22 linear gratings that are slightly different in terms of their azimuth angle from zone to zone along the extension of the arrow are again provided correspondingly. However, this is interrupted by a microstructure in the form of anisotropic mat structures 61 which are provided for instance by second grid areas 42. The orientation of the anisotropic mat structures 61 also changes gradually depending on the associated successive zones or the azimuth angle associated with the corresponding linear grating. Due to the anisotropic mat structures, at a particular point on the arrow, a bright point appears which changes when the optically variable element is rotated either in the direction of the arrow to strengthen the effect of the color movement or in the opposite direction to achieve a surprising effect. Further structures such as e.g. an isotropic mat structure or a crossed grating can be provided in the contour of the arrow.

Figure 7A:
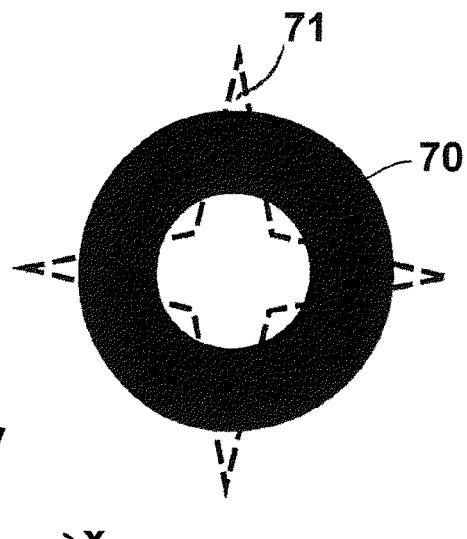
Figure 7B:
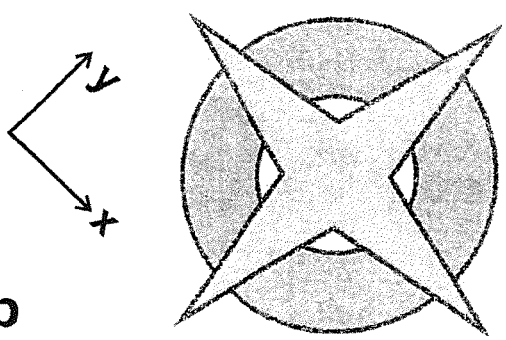
Figure 7C:
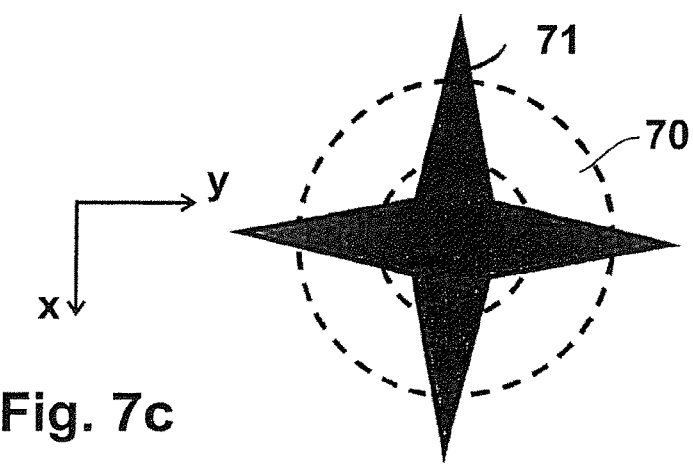

In a fifth embodiment example in each case a different pattern, namely e.g. a ring 70 and a star 71, see FIGS. 7a-c, is provided by grid areas 41 and 42 interlaced in one another.

Figure 7D:
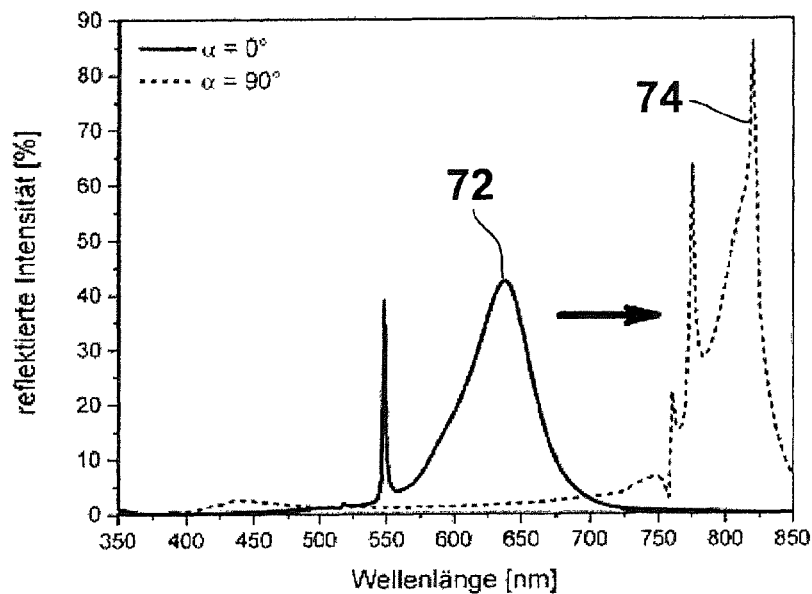
FIGS. 7d and 7e represent reflection spectra, using which the optical effect achieved in each case is explained.

However, if a parameterization other than in the other embodiment examples is used: then FIG. 7d shows, in a continuous line, a reflection spectrum 72 of an optically variable element which has the properties explained above using FIG. 1 with the parameters grating period equal to 510 nm, grating depth equal to 150 nm and thickness of the zinc sulfide layer equal to 80 nm. The grating shape is sinusoidal. The reflection spectrum applies to an angle of illumination of 30°. If the azimuth angle α lies at 0°, then the color red (see maximum at approx. 650 nm) is seen. When the azimuth angle is altered by 90°, in contrast, the near-infrared is reached, see the reflection spectrum 74.

Figure 7E:
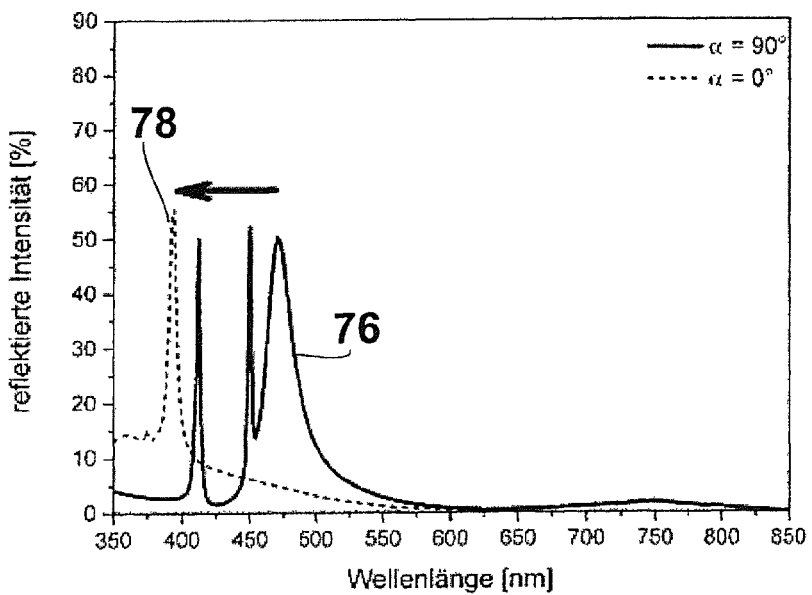

Alternatively the reflection spectrum 76 shown using FIG. 7e is provided with a maximum at blue which at another azimuth angle moves according to reflection spectrum 78 into ultraviolet A. Here the grating period is equal to 200 nm, the grating depth is equal to 100 nm and the thickness of the zinc sulfide layer 10 from FIG. 1 is equal to 80 nm.

In FIG. 7a the parameters to which the reflection spectrum 72 according to FIG. 7d applies are chosen for the ring and the parameters to which the reflection spectrum 78 according to FIG. 7e applies are chosen for the star.

If the optically variable element, thus the ring 70 and the star 71, is rotated now, there is then a color movement of the ring 70 from red (FIG. 7a) to barely visible (FIG. 7b) into the near-infrared, thus invisible to the naked human eye (FIG. 7c). The star 71 passes through the opposite color movement from blue (FIG. 7c) to weakly visible (FIG. 7b) and to not visible at all (FIG. 7a). In this way an image flip can be brought about by the use of a color movement effect, i.e. when the optically variable element is rotated the ring 70 is seen in red at an angle of rotation ϕ, at another angle the star 71 is seen in blue.

Additional color movement effects can be achieved by a variation of the azimuth angle α in the ring or in the star.

Figure 8A:
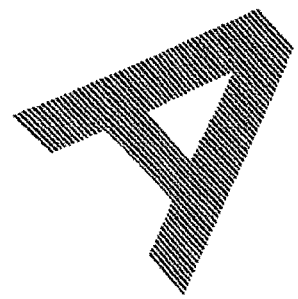
FIGS. 8a-8e illustrate a sixth embodiment example of the invention in top view.
Figure 8B:
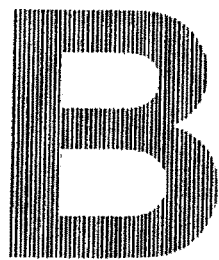
Figure 8C:
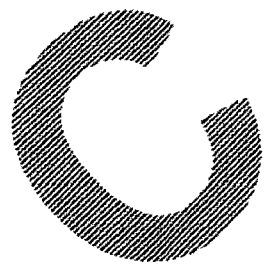
Figure 8D:
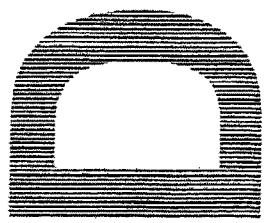
Figure 8E:
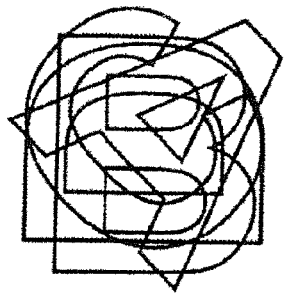

A sixth embodiment example is explained using FIGS. 8a to 8e:

In this embodiment example four motifs are interlaced in one another, in the present case in the form of an "A", "B", "C" and "D". FIGS. 8a to 8d show the elements individually, wherein the "A" shown in FIG. 8a is provided by first grid areas, the "B" shown in FIG. 8b is provided by second grid areas, the "C" shown in FIG. 8c is provided by third grid areas and the "D" shown in FIG. 8d is provided by fourth grid areas, wherein the first, second, third and fourth grid areas are interlaced in one another similarly to what was explained above using FIGS. 5a and 5b, preferably without the named bars 49. A diffraction grating with the grating period d of 510 nm is provided in the area of the first and third grid areas. A diffraction grating with the grating period d of 200 nm is provided in the area of the second and fourth grid areas.

The angle of rotation ϕ is defined such that at ϕ=0° precisely the "B" is seen in the correct orientation. The azimuth angle of the diffraction grating is α=135° or −45° in the case of the first grid areas, α=90° in the case of the second grid areas, α=45° in the case of the third grid areas and α=0° in the case of the fourth grid areas. The hatching in FIGS. 8a to 8d illustrates the orientation of the diffraction gratings.

The following effect of an image flip is achieved: at an angle of rotation of ϕ=−45° the letter "A" is to be seen in deep red (reflection spectrum 72), the "B" and the "D" are present quite weakly in violet, wherein the "C" is not visible (reflection spectrum 74). If the security element is rotated to ϕ=0°, the "B" appears in blue (reflection spectrum 76) and in the correct reading orientation, while the "A" and the "C" are weakly dark red and the "D" is not visible (reflection spectrum 78). At ϕ=45° the "C" is deep red (reflection spectrum 72) and in the correct reading orientation, the "B" and the "D" are weakly violet and the "A" is not visible (reflection spectrum 74). At the angle of rotation of ϕ=90°, in contrast, the "D" is blue (reflection spectrum 76) and in the correct reading orientation, the "A" and the "C" are weakly dark red, the "B" is not visible (reflection spectrum 78).

In other words, when the optically variable device is rotated, the letters A (deep red), B (blue), C (deep red) and D (blue) are seen in succession, namely in the correct reading orientation in each case. Image flip or image movement effects are also possible through slight variation of the arrangement and of the motifs.

Figure 9C:
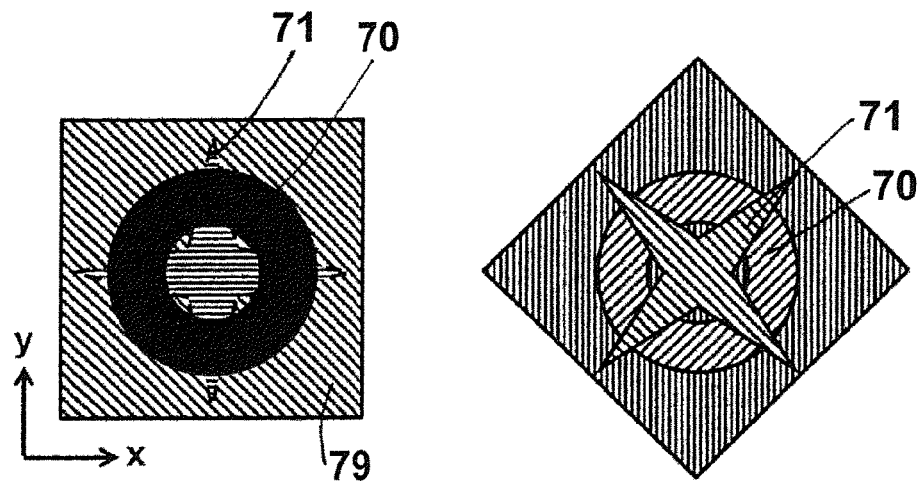
Figure 9C:
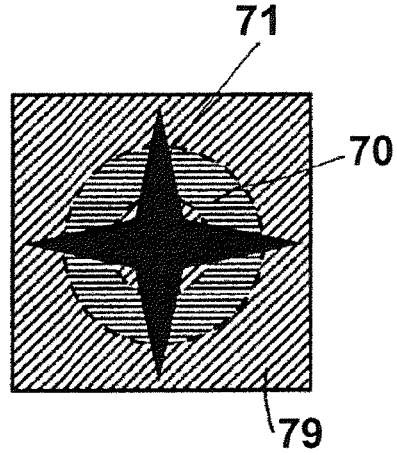

In a seventh embodiment example (FIGS. 9a-9c), which takes up the fifth embodiment example, the effect of an image flip is achieved in another way. Different grid areas represent the same color at a particular angle of rotation ϕ, even if they are covered with quite different diffraction gratings. The hatching in FIGS. 9a-9c illustrates the orientation of the diffraction gratings.

Figure 9D:
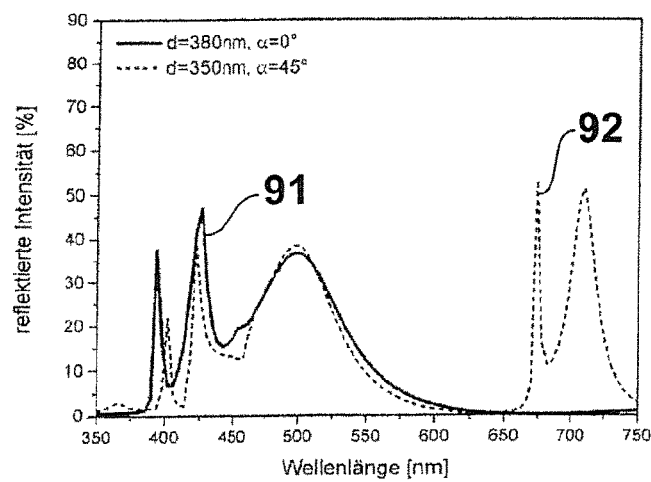
FIG. 9d represents reflection spectra, using which the effect achieved is explained.

FIG. 9d shows a first reflection spectrum 91 and a second reflection spectrum 92. The first reflection spectrum 91 (continuous line) is associated with grid areas in which a sinusoidal and linear diffraction grating has a grating period of 380 nm and a grating depth of 150 nm, and wherein a zinc sulfide layer, as layer 10, has a thickness of 80 nm. The angle of illumination Θ is approximately 30°. The orientation of the grating lines lies, in the case of these grid areas, perpendicular to the viewing direction, thus α=0°. The second reflection spectrum 92 (dashed line) is the reflection spectrum of grid areas in which the sinusoidal and linear diffraction grating has a grating period of 350 nm, a grating depth of 150 nm and in which the first layer 10 made of zinc sulfide has a layer thickness of 80 nm. Here, however, the orientation of the grating lines is diagonal to the viewing direction, thus α=45° (or also α=−45°.

In the spectrum 91 the most important reflection peak for the color impression lies at a wavelength of approx. 500 nm, thus the grid areas associated with the spectrum 91 appear green. In the reflection spectrum 92 the reflection peak lies more or less at the same wavelength and is almost identical to the reflection peak of the other grid areas. (The additional narrow double peak at a wavelength of approx. 700 nm is almost invisible to the human eye and irrelevant for the color impression.)

The color impression of both grid elements is therefore substantially the same.

If the ring 70 is now provided by grid areas in which the diffraction grating has the grating period of 380 nm and the grid lines are parallel to the viewing direction, then the ring appears red. The star 71 is provided by grid areas with a diffraction grating with the grating period of 380 nm, but here the grid lines run perpendicular to the viewing direction and the reflection spectrum 91 becomes active. Thus the star appears green. In this seventh embodiment example a square background 79 is now provided with the diffraction grating with the grating period of 350 nm, at which the reflection spectrum 92 is active. Because the background then likewise appears green, the image produced as a whole is a red ring in a green square, as indicated schematically in FIG. 9a. When the optically variable element is rotated through an azimuth angle of 90° the situation shown in FIG. 9c results: the ring 70 and the star 71 have swapped colors, but the background 79 is green (again). As a whole a red star in front of a green background thus results. At angles of rotation between 0° and 90° the color impressions of the three areas differ. (FIG. 9b shows the situation at an angle of rotation of 45°, at which the ring and the star appear equally.) The hatching in each case illustrates the grating orientation.

The seventh embodiment example can be modified and for example can take up the sixth embodiment example. For example a letter in front of e.g. a star-shaped background can be provided (for instance a red "A" in front of a green star) and in the case of rotation of the angle of rotation through 90° another letter (e.g. a "B") can appear red in front of a green star, or else the star can remain quite homogeneously green.

In an eighth embodiment example a true-color image is provided. First grid areas in the manner of the grid areas 41 shown in FIG. 5a provide the primary color red, second grid areas in the manner of the grid areas 42 shown in FIG. 5a provide the primary color green and third grid areas in the manner of the grid areas 43 shown in FIG. 5a provide the primary color blue, together the grid areas form a color region which serves as a pixel.

For example, to provide these primary colors, at an angle of incidence and thus an angle of emergence of the diffraction into the zero order of Θ~30°, in the case of a layer thickness of the first layer of 80 nm, it can be provided that, to achieve the primary colors red and green, a diffraction grating with a grating period d of 380 nm and a grating depth t of 150 nm is provided, wherein the azimuth angle α of the diffraction grating is α=90° in the case of the primary color red and α=0° in the case of the primary color green. To provide the primary color blue, a diffraction grating with a grating period of 330 nm, a grating depth of 100 nm and with an azimuth angle of α=0° is provided in third grid areas. Alternatively all diffraction gratings can have the same grating period.

The individual grid areas can be elongate (not shown in the figure), in particular can have an extent in one direction of less than 300 μm and preferably less than 80 μm, and an extent in the other direction of more than 300 μm, preferably of more than 1 mm. All pixels can be designed in this way, but at least 30% should be designed in this way, preferably more than 50% and particularly preferably more than 70% of the grid elements.

Figure 10A:
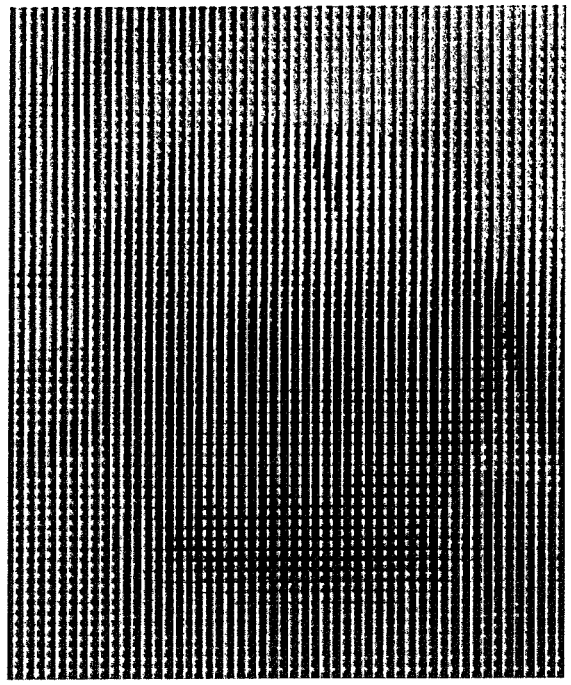
FIGS. 10a to 10d show an eighth embodiment example of the invention in top view.
Figure 10B:
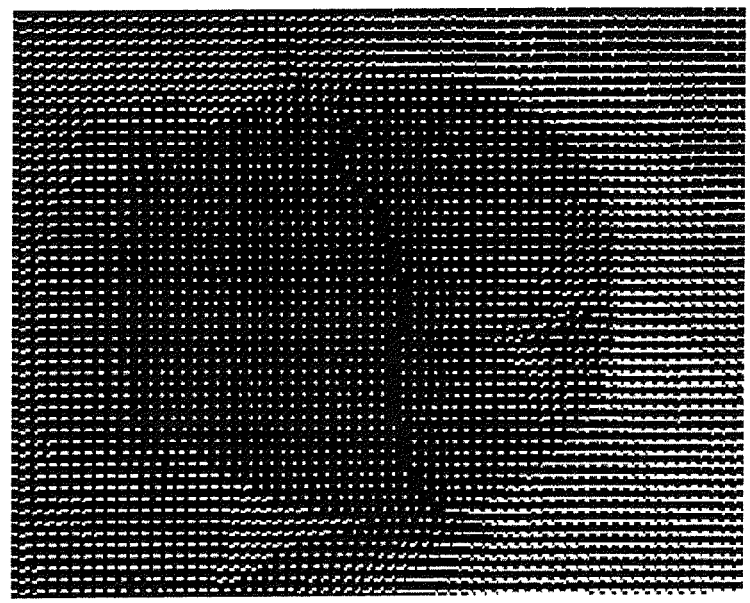

Using FIG. 10a it is now explained that, utilizing the spectra explained using FIGS. 7d and 7e, a true-color image can be changed into a monochromatic image, if the angle of rotation rotates through 90°:

The components for red must then be chosen such that in the case of rotation through 90° they migrate into the near-infrared (in particular to wavelengths greater than 690 nm), and the components for blue are chosen such that in the case of rotation through 90° they migrate into ultraviolet A (in particular to wavelengths smaller than 430 nm). The green color component can change to red in the case of rotation, whereby the previous true-color image as indicated schematically in FIG. 10b now appears monochromatically in red. Alternatively the green color component can change to blue in the case of rotation, the image then appears monochromatically in blue.

Figure 4C:
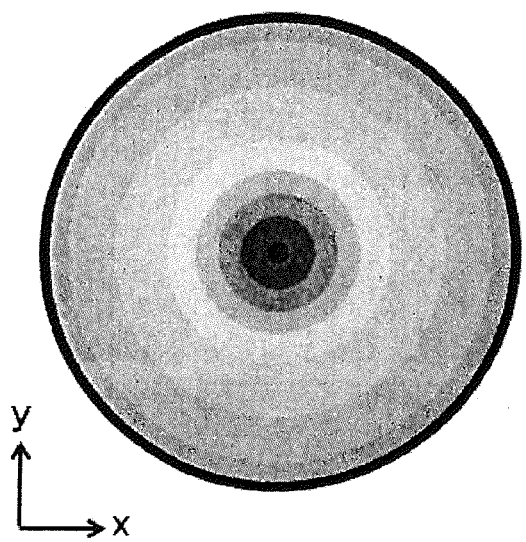
FIG. 4c and FIG. 4d illustrate the color effect achieved in each case.
Figure 4D:
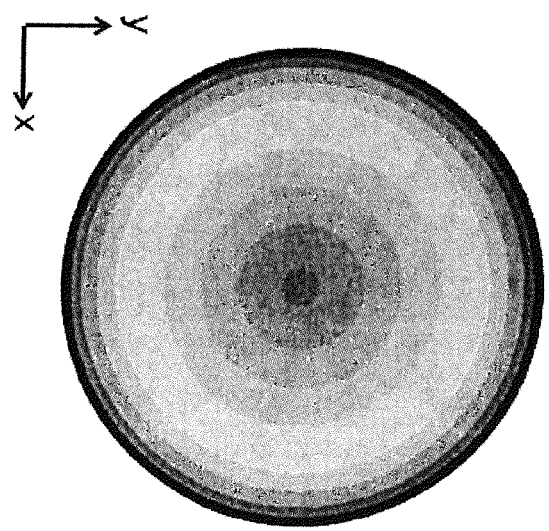
Figure 10C:
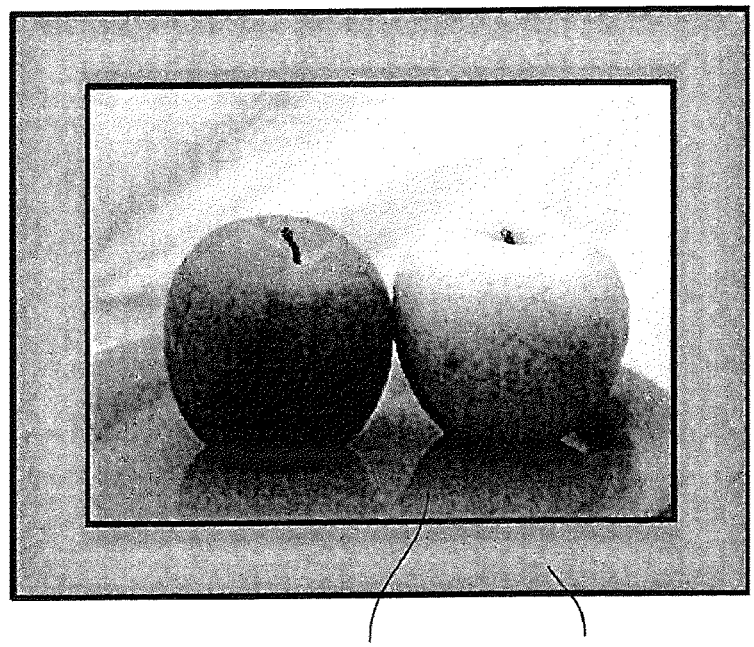
Figure 10D:
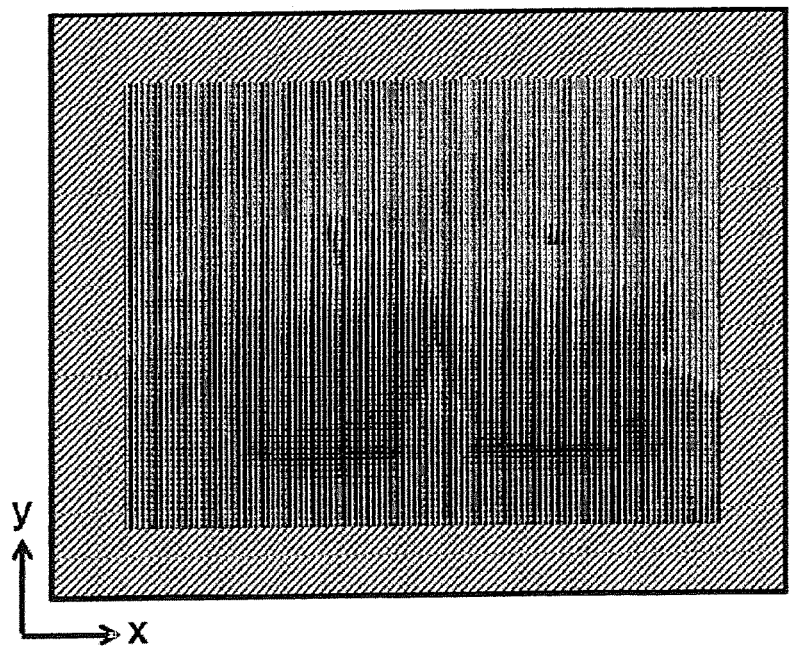

In connection with a true-color image, the effect of pumping explained above using the third embodiment example can also be utilized: in this case a frame 102, which shows the color movement effect similar to the concentric rings from FIGS. 4a-c, is added to the actual image 101 (see FIGS. 10c and 10d). If the color migrates from an inner area of the frame 102 to the outside, the true-color image can then become visible when a particular color has arrived at the outer frame 102.

Figure 11A:
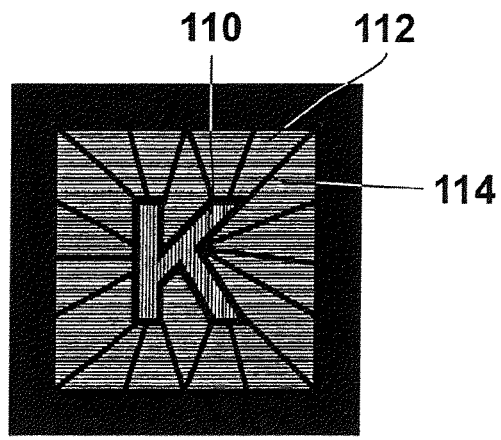
FIGS. 11a-11c show a ninth embodiment example of the invention in top view and, for this.
Figure 11B:
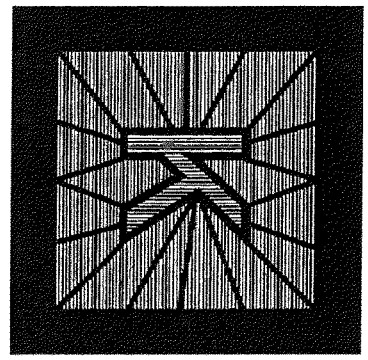
Figure 11C:
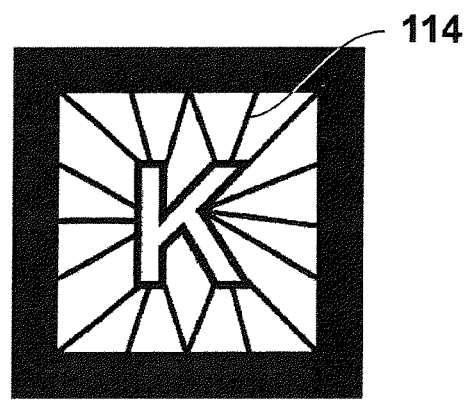

In a ninth embodiment example there are zones 110 and further zones 112, which show different color effects at different angles of rotation. Metalized areas 114 are present in the transition area between these zones. Separately these result in a pattern quite of their own which in particular is also recognizable in transmitted light, cf. FIG. 11c. Furthermore the zones 110 and 112, also viewed in transmitted light, have a color impression as well as a color effect in the case of tilting and also in the case of rotation (in the tilted state). If these zones 110 and 112 have the same relief structure, but which is arranged at another azimuth angle, then the color impression in transmitted light is, however, identical in the case of perpendicular observation. If the security feature, in contrast, is viewed tilted in transmitted light, then the color impressions of the two zones 110 and 112 differ. In contrast, if the zones 110 and 112 have different relief structures, then the color impression in transmitted light is also different in the case of perpendicular observation.

Figure 11D:
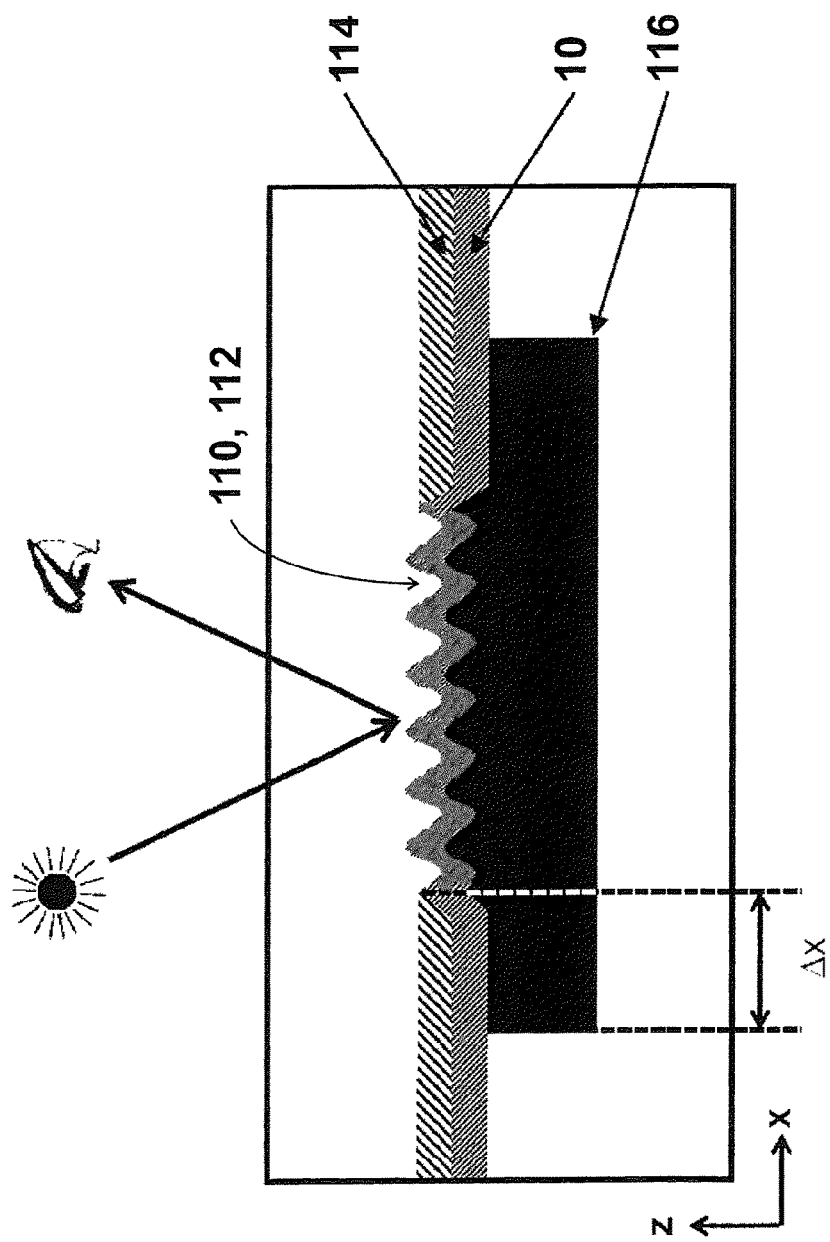
FIG. 11d shows an example of a layer structure.

A layer sequence as shown in FIG. 11d can be provided here:

A metal layer initially vapor-deposited over the whole surface (for instance made of aluminum) has been freed of metal, in a manner known per se, where a relief structure is provided to produce an effect according to the invention into the zero diffraction order (areas 110, 112), wherein the freed areas are preferably registered relative to (relief) structures and/or mirror surfaces not freed of the metal. The optically variable element has then been provided with the high-refractive-index first layer 10 over the whole surface.

Optionally a color layer 116 can additionally be provided underneath the relief structure (in particular a dark varnish layer, e.g. a black adhesive layer as back printing). Through the use of such a color layer 116 it is possible to strengthen the contrast strength in the case of the provision of the color effect in the color effect region. This contrast strengthening takes place in particular by absorption of light components which pass through the other layers and would otherwise be reflected and scattered at a brighter substrate surface, wherein this scattered light would be reflected and would weaken the optically variable effect or the color effect thereof. Such a dark back printing thus cannot be easily provided quite perfectly registered, but it can be concealed under the metal layer by the perfect fit thereof: the area of the color layer 116 with the width Δx lies underneath the metal layer 114 and therefore is not visible.

The back printing can, on the one hand, be used to improve the color contrast. However, it can also be used as a static reference for the human eye for the variable color movement. However, this printed reference need not necessarily be present underneath the relief structure. It can also be applied above or be part of the substrate.

Figure 11E:
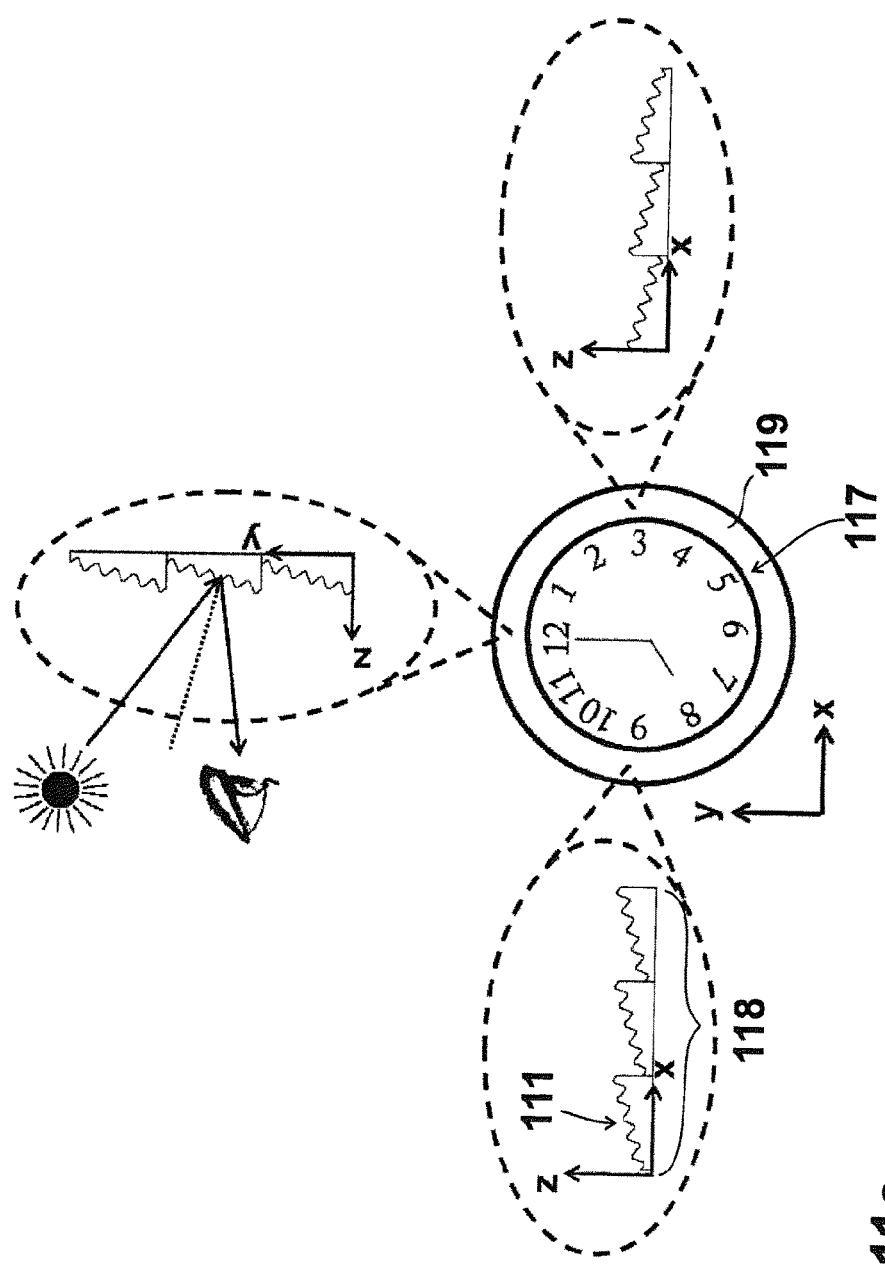
FIG. 11e shows a superimposition of a diffractive relief structure with a blazed grating and illustrates the use of this superimposition in an example, FIGS. 12a and b show an example of a security document in the form of a banknote in top view in which an embodiment of the invention is implemented.

In a particular embodiment according to FIG. 11e (e.g. diffractive) relief structures 111 with a small grating period (less than 500 nm) are superimposed on an achromatic blazed grating 118 which is low-frequency (i.e. has grating periods of more than 700 nm, preferably more than 1000 nm and has a comparatively large structure depth, e.g. between 500 nm and 5000 nm. The color impression is thereby not achieved in the case of perpendicular observation, but when the optically variable element is tilted.

Several such superimpositions can be gridded/interlaced in one another in order for different color effects to be able to appear at angles of rotation of 0°, 90°, 180° and 270°. For example a four-color rotation effect can be realized by interlacing of such blazed gratings with superimposed relief structures, e.g. at an angle of illumination Θ~10° from red (φ=0°) to green (φ=90°) to blue (φ=) 180° and to yellow (φ=270°).

Alternatively one and the same color, e.g. green, can become visible at different angles of rotation in different areas of the security element, wherein in each case only one of the areas shows the color strongly pronounced, while the other areas rather appear dark. Here the orientation of the blazed grating (with e.g. blaze angles of approx. 20°) in the areas is chosen such that, for the respective angle of rotation, the superimposed relief structure reflects the color green. In this way, for example, a clock 117 can be represented which is likewise shown in FIG. 11e. When the optically variable element is rotated, e.g., the green color in the outer ring 119 rotates. The enlarged sections show how the superimposed structures are present in the three exemplary areas. In the areas in-between, the superimposed structure is arranged e.g. rotated in steps of 5°. In the area above the number "12" it is additionally represented how the light reaches the observer from the light source. All areas which do not fit with the illumination condition (that is do not direct the incident light such that it strikes the eye of the observer) appear dark.

Figure 12A:
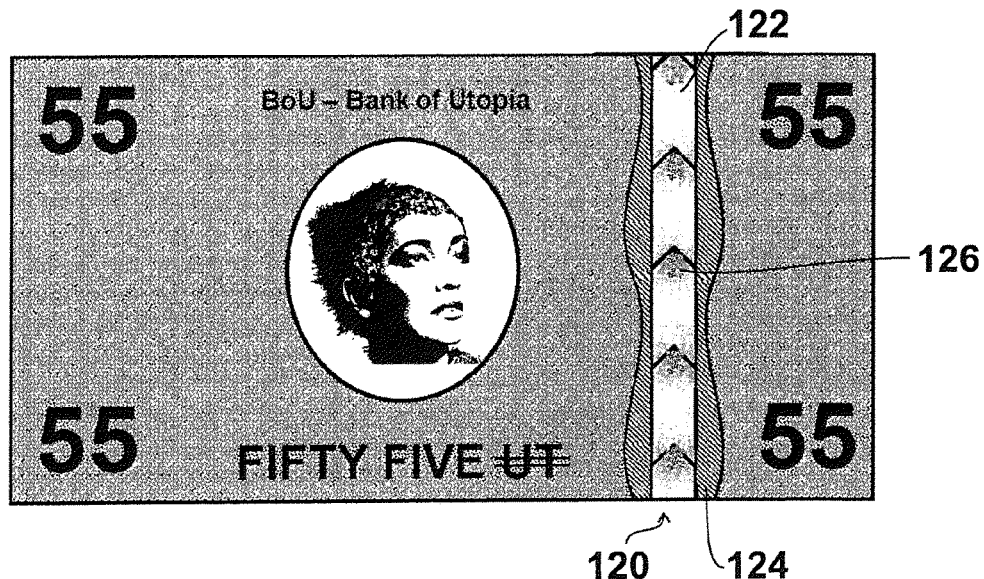
Figure 12B:
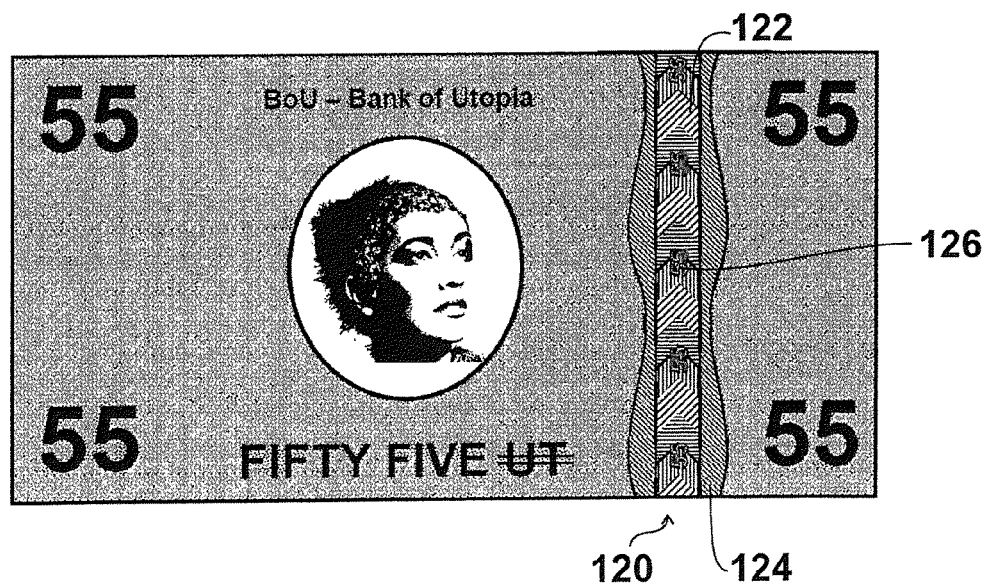

FIGS. 12a and b show a specific embodiment example of a sample banknote as an optically variable security element or with an optically variable element 120:

In the center of the optically variable element 120 V-shaped elements 122, forming an arrow shape, are provided, as was described above as second embodiment example with reference to FIG. 3. The V-shaped elements are framed by metallic areas 124 which provide further effects such as e.g. a surface relief structure or first- or higher-order diffraction in the colors of the rainbow. The whole optically variable element 120 is applied, with an adhesive dyed black, to the banknote substrate.

When the banknote is rotated the green color migrates from the respective arrow ends to the arrowheads, which produces a dynamic, pumping appearance that can be easily checked as a whole. The value specification "55" is provided by local removal of the first layer 10.

Figure 13:
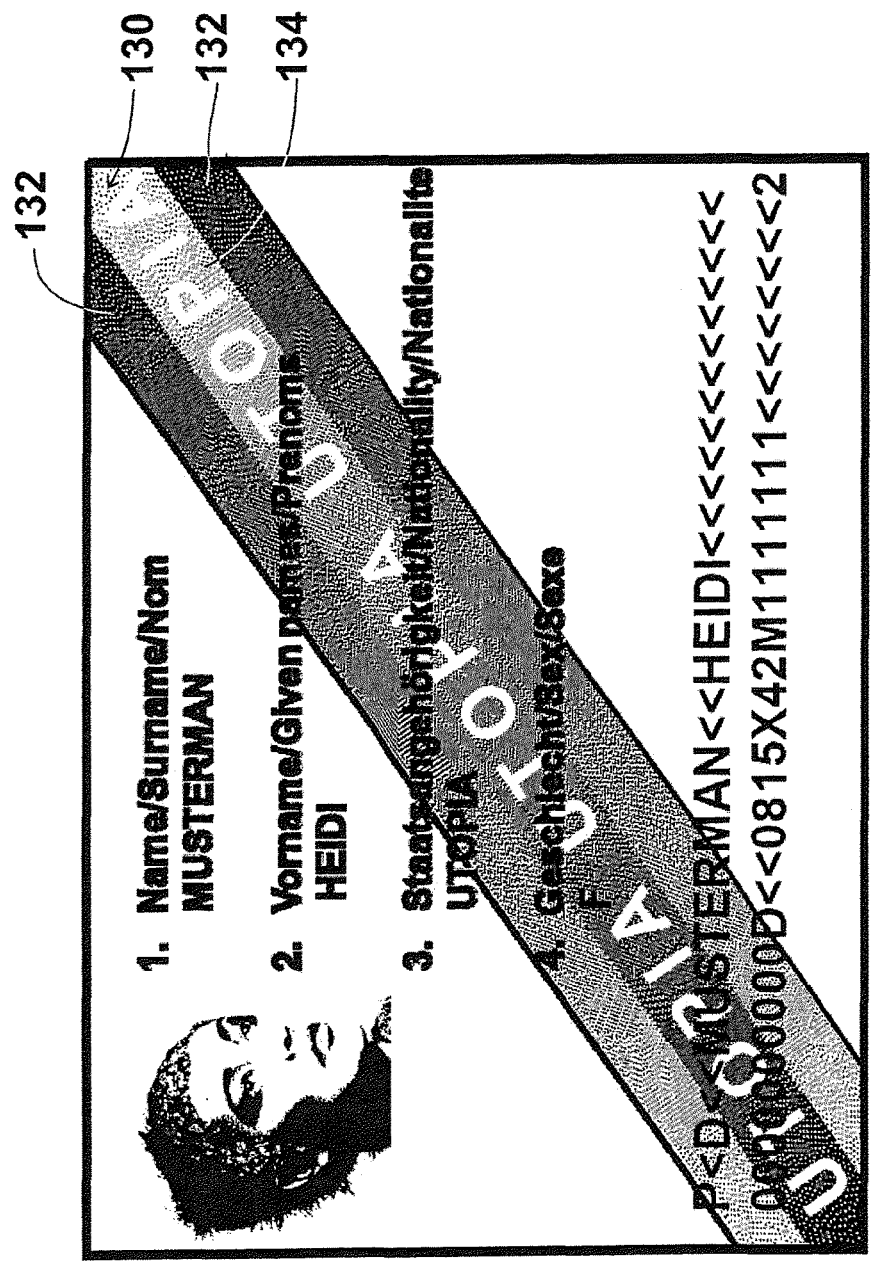
FIG. 13 shows an example of a page of a passport document in top view in which an embodiment of the invention is implemented, FIG. 14 schematically shows an example of a KINE-GRAM® TKO or KINEGRAM® PCI.

FIG. 13 shows the data page of a sample passport, which is provided with a transparent or translucent, multilayered top layer with, in particular transparent, diffractive diffraction structures molded in a layer (a so-called KINEGRAM® TKO (TKO=Transparent KINEGRAM® Overlay)), which is labeled 130. This top layer has a central strip 134 and two edge strips 132. The color effect is designed such that when the sample passport is rotated clockwise a green color impression runs from bottom left to top right in the side strips, and in the opposite direction, i.e. from top right to bottom left, in the central strip. In addition, a country name "Utopia" is provided by local stripping of the first layer 10. In this case the adhesive is not dyed, but is designed transparent, in order that the information on the data page of the passport remains readable. The color movement effect achieved, together with the achieved interference with the effect by the areas with the interruption (letters "Utopia"), is a security feature that catches the eye and can thus be easily checked.

Further specific embodiment examples of the invention are:

A KINEGRAM® TKO, which is laminated onto the data page of a passport and has, e.g. in the upper right-hand corner, a color movement effect, as represented in FIGS. 4a-d. The diameter of the pumping colored circle is e.g. 15 mm.

Figure 14:
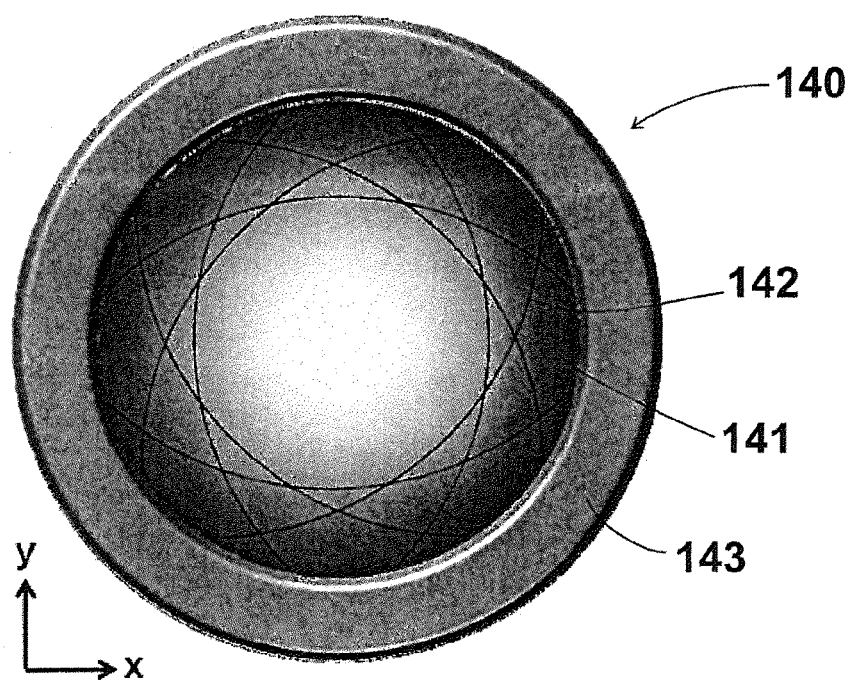

A KINEGRAM® TKO shown in FIG. 14, which, in the pumping colored circle 141, additionally has fine guilloche lines 142 with diffractive diffraction structures as well as a reflective layer made of metal, wherein the guilloche lines 142 show a first- and/or higher-order diffractive rainbow effect. Furthermore the pumping colored circle is surrounded in the shape of a ring by metalized diffraction structures which simulate a macroscopic freeform surface, wherein the ring 143 has a diameter of approx. 3 mm.

A KINEGRAM® PCI (PCI=Plastic Card Inlay), i.e. a transparent or translucent, multilayered film with, in particular transparent, diffraction structures molded in a layer, which is laminated into an ID-1 card and has a color movement effect, as represented in FIGS. 4a-d, in the upper right-hand corner. The diameter of the pumping colored circle is e.g. 8 mm.

A KINEGRAM® PCI which, in the pumping colored circle, additionally has fine guilloche lines with diffractive diffraction structures as well as a reflective layer made of metal, wherein the guilloche lines show a first- and/or higher-order diffractive rainbow effect. Furthermore the pumping colored circle is surrounded in the shape of a ring by metalized diffraction structures which simulate a macroscopic freeform surface, wherein the ring has a diameter of 2 mm. FIG. 14 also shows such a security feature schematically.

The invention claimed is:

1. An optically variable element, wherein the optically variable element has at least one first diffraction grating and at least one second diffraction grating with a grating period in each case from the range of between 100 nm and 500 nm, wherein the first diffraction grating and the second diffraction grating are designed such that:
  a) at a predetermined angle of rotation defined in respect of a rotation about a normal to a surface of the optically variable element and at a predefined angle of illumination defined in respect of this rotation, a first color is generated by the first diffraction grating and a second color, different from the first color, is generated by the second diffraction grating, wherein the respective azimuth angles of the first and second diffraction gratings differ by at most 25°, and
  wherein the optically variable element comprises at least three zones, which succeed one another in at least one lateral direction, wherein each zone has a diffraction grating, of which the first zone has the first diffraction grating, the second zone has the second diffraction grating and the third zone has a third diffraction grating, different from the first and second diffraction gratings, wherein the diffraction gratings belonging to, in each case, two zones succeeding one another in the at least one lateral direction differ in that:
  i) their azimuth angles differ by at least 0.1° and at most 15°; or
  ii) their grating periods differ by a value from the range of from 1 nm to 10 nm,
  wherein for at least three successive zones the respective value for the azimuth angle or the grating period changes in the same direction, and
  wherein one or more of the zones has a dimension in at least one lateral direction of more than 1 mm.

2. An optically variable element according to claim 1, wherein the azimuth angles of the diffraction gratings of zones succeeding one another in the at least one lateral direction differ by an amount between 0.2° and 10°.

3. An optically variable element according to claim 1, wherein the grating periods of two diffraction gratings of zones succeeding one another in the at least one lateral direction differ by a value from the range of from 1 nm to 7 nm.

4. An optically variable element according to claim 1, wherein each of the zones has a dimension in two lateral directions in each case of more than 0.5 mm, and/or wherein each of the zones has a dimension in two directions in each case of at most 50 mm.

5. An optically variable element according to claim 1, wherein several successive zones of the zones together form a rectilinear or curved band.

6. An optically variable element according to claim 1, wherein several successive zones of the zones in each case have the form of a curved band which is at least partially surrounded by a zone, succeeding the respective zone, in the form of a curved band, wherein annular bands, are provided by the several of the successive zones.

7. An optically variable element according to claim 1, wherein one or more of the zones comprise a plurality of first areas as well as of second or second and third or second, third and further areas which provide a different optical effect from the first areas, wherein in the respective first areas of zones, in each case, the same diffraction grating is formed from the first diffraction grating, the second diffraction grating, the third diffraction grating or a further diffraction grating.

8. An optically variable element according to claim 7, wherein the first areas and/or the second areas or the third areas or the further areas have a dimension in at least one first lateral direction of less than 300 μm.

9. An optically variable element according to claim 7, wherein the other optical effect consists in the generation of a color, dependent on a respective angle of rotation and predefined angles of illumination, which differs, at least for one range of angles of rotation and illumination, from a color which is generated in each case by the first areas.

10. An optically variable element according to claim 7, wherein the other optical effect is based on another physical principle.

11. An optically variable element according to claim 7, wherein, in second and/or third and/or further areas, microstructures different from the diffraction gratings provided in the first areas are provided, and/or refractively acting macrostructures are provided.

12. An optically variable element according to claim 10, wherein, in one or more of the zones, the first areas occupy at least 50% of the surface area covered by the respective zone.

13. An optically variable element according to claim 7, wherein the other optical effect, when the angle of rotation and/or angle of illumination is changed, consists in the appearance of a movement of an optical property which is in the same direction as or in the opposite direction to the appearance of a movement of the color generated by the zones along the successive zones.

14. An optically variable element according to claim 1, wherein fourth and fifth grid areas are at least partially interlaced in one another, forming a one- or two-dimensional grid, wherein the at least one first diffraction grating is provided in the fourth grid areas and the at least one second diffraction grating is provided in the fifth grid areas.

15. An optically variable element according to claim 14, wherein a color is generated with a first intensity by the at least one first diffraction grating and/or the at least one second diffraction grating in each case in a predetermined range of angles of rotation at a predefined angle of illumination, and outside the predetermined range of angles of rotation electromagnetic radiation from the range of visible light is only generated with a second intensity which is at most one third of the first intensity.

16. An optically variable element according to claim 14, wherein the fourth grid areas on the one hand and the fifth grid areas alone or with sixth or with sixth and further grid areas on the other hand represent different items, wherein an item is a motif, a geometric shape, a pattern, a symbol and/or an alphanumeric character, and/or an image background.

17. An optically variable element according to claim 16, wherein an identical color is generated for two different items at at least a first angle of rotation relative to a predefined angle of illumination, despite the different properties of different diffraction gratings, and different colors are generated at a second angle of rotation relative to the predefined angle of illumination.

18. An optically variable element according to claim 14, wherein the fourth and/or fifth grid areas have a dimension in at least one lateral direction of less than 300 μm.

19. An optically variable element according to claim 1, wherein a plurality of color regions are provided which are arranged according to a one- or two-dimensional grid and in each case form a picture element of a first motif, wherein the color regions have a combination of seventh and eighth or seventh, eighth or ninth partial areas, wherein the first diffraction grating is provided in the seventh partial areas, the second diffraction grating is provided in the eighth partial areas and a third diffraction grating is provided in the ninth partial areas.

20. An optically variable element according to claim 19, wherein one or more of the color regions have a dimension in each lateral direction of at most 300 μm.

21. An optically variable element according to claim 19, wherein one or more of the color regions have a dimension in one lateral direction of less than 300 μm, and have a dimension in a second lateral direction of more than 300 μm.

22. An optically variable element according to claim 19, wherein a multicolored image is generated by the color regions at a first angle of rotation and a predefined angle of illumination, and wherein a monochromatic image is generated by the color regions at a second angle of rotation and the predefined angle of illumination.

23. An optically variable element according to claim 1, further comprising a blazed grating, on which the first and the second diffraction gratings are superimposed.

24. An optically variable element according to claim 1, further comprising a color layer provided at least in areas.

25. An optically variable element according to claim 1, wherein the optically variable element has a first layer made of a first material and a second layer made of a second material, wherein the first diffraction grating and the second diffraction grating are provided by a relief structure which is formed on the boundary surface of the first layer with the second layer.

26. An optically variable element according to claim 25, wherein the second material has a refractive index that is higher than that of the first material by 0.2, wherein the first material has a refractive index of more than 1.8.

27. An optically variable element according to claim 25, wherein the first layer is embedded in the second layer.

28. An optically variable element according to claim 25, wherein the average thickness of the first layer is between 30 nm and 300 nm.

29. An optically variable element according to claim 25, wherein the value of a profile depth of the relief structure formed on the boundary surface of the first layer with the second layer is between 50 nm and 500 nm.

30. An optically variable element according to claim 25, wherein a profile of the relief structure is sinusoidal or rectangular or provides a blazed grating.

31. An optically variable element according to claim 1, further comprising a linear grating, a crossed grating or hexagonal grating as first and/or second diffraction grating.

32. An optically variable element according to claim 1, wherein the optically variable element comprises at least two repetitive length units succeeding one another in the lateral direction, each repetitive length unit having the at least three zones, wherein the azimuth angle of the diffraction grating in each succeeding zone in each of the at least two repetitive length units in the lateral direction differ by a fixed angular amount.

33. An optically variable element, wherein the optically variable element has at least one first diffraction grating and at least one second diffraction grating with a grating period in each case from the range of between 100 nm and 500 nm, wherein the first diffraction grating and the second diffraction grating are designed such that:
  a) at a first angle of rotation defined in respect of a rotation about a normal to a surface of the optically variable element and at a predefined angle of illumination defined in respect of this rotation, a color is generated by the first diffraction grating on the basis of light with wavelengths from the range of between 430 nm and 690 nm and a color is generated by the second diffraction grating on the basis of wavelengths which are either smaller than 430 nm or greater than 690 nm, and at a second angle of rotation defined in respect of the rotation and at the predefined angle of illumination a color is generated by the second diffraction grating on the basis of light with wavelengths from the range between 430 nm and 690 nm and a color is generated by the first diffraction grating on the basis of wavelengths which are either greater than 690 nm or smaller than 430 nm,
  wherein the optically variable element comprises at least three zones, which succeed one another in at least one lateral direction, wherein each zone has a diffraction grating, of which the first zone has the first diffraction grating, the second zone has the second diffraction grating and the third zone has a third diffraction grating, different from the first and second diffraction gratings, wherein the diffraction gratings belonging to, in each case, two zones succeeding one another in the at least one lateral direction differ in that:
  i) their azimuth angles differ by at least 0.1° and at most 15°; or
  ii) their grating periods differ by a value from the range of from 1 nm to 10 nm,
  wherein for at least three successive zones the respective value for the azimuth angle or the grating period changes in the same direction, and
  wherein one or more of the zones has a dimension in at least one lateral direction of more than 1 mm.

34. An optically variable element according to claim 33, wherein the optically variable element comprises at least two repetitive length units succeeding one another in the lateral direction, each repetitive length unit having the at least three zones, wherein the azimuth angle of the diffraction grating in each succeeding zone in each of the at least two repetitive length units in the lateral direction differ by a fixed angular amount.

* * * * *